United States Patent
Israel et al.

(10) Patent No.: US 10,534,925 B2
(45) Date of Patent: Jan. 14, 2020

(54) DETECTION OF COMPROMISED DEVICES VIA USER STATES

(71) Applicant: Microsoft Technology Licensing, LLC, Redmond, WA (US)

(72) Inventors: Moshe Israel, Ramat-Gan (IL); Royi Ronen, Tel-Aviv (IL); Daniel Alon, Tel-Mond (IL); Tomer Teller, Tel-Aviv (IL); Hanan Shteingart, Herzelia (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 134 days.

(21) Appl. No.: 15/286,558

(22) Filed: Oct. 5, 2016

(65) Prior Publication Data
US 2018/0096157 A1    Apr. 5, 2018

(51) Int. Cl.
| | | |
|---|---|---|
| G06F 21/56 | (2013.01) | |
| G06F 21/62 | (2013.01) | |
| H04L 29/08 | (2006.01) | |
| H04L 12/24 | (2006.01) | |
| H04L 12/26 | (2006.01) | |
| G06F 21/55 | (2013.01) | |
| H04L 29/06 | (2006.01) | |

(52) U.S. Cl.
CPC .......... *G06F 21/6218* (2013.01); *G06F 21/55* (2013.01); *G06F 21/566* (2013.01); *H04L 41/06* (2013.01); *H04L 43/16* (2013.01); *H04L 63/1416* (2013.01); *H04L 63/1441* (2013.01); *H04L 67/22* (2013.01); *H04L 67/306* (2013.01); *G06F 2221/034* (2013.01)

(58) Field of Classification Search
CPC ..... G06F 21/6218; G06F 21/55; G06F 21/566
USPC ............................................................ 726/1
See application file for complete search history.

(56) References Cited

U.S. PATENT DOCUMENTS

| | | |
|---|---|---|
| 8,280,968 B1 | 10/2012 | Duan |
| 8,464,341 B2 | 6/2013 | Cohen |
| 8,595,834 B2 | 11/2013 | Xie et al. |
| 8,943,598 B1 | 1/2015 | Kurian |
| 8,978,150 B1 | 3/2015 | Rosen et al. |

(Continued)

OTHER PUBLICATIONS

"International Search Report and Written Opinion Issued in PCT Application No. PCT/US2017/051962", dated Dec. 1, 2017, 15 Pages.

(Continued)

*Primary Examiner* — Matthew T Henning
(74) *Attorney, Agent, or Firm* — Workman Nydegger

(57) ABSTRACT

Controlling device security includes obtaining a set of device activity data indicating current device activity on a device and a set of user activity data indicating a current activity state of one or more legitimate users of the device. It is determined whether the indicated current activity state of the users indicates that a legitimate user is in an active state on the device, or that none of the legitimate users is in an active state on the device. A statistical fit of the indicated current device activity on the device, with the indicated current activity state of the one or more legitimate users, is determined, by a comparison with at least one of the models that are generated via supervised learning. A security alert action may be initiated, based on a result of the determination of the statistical fit indicating a compromised state of the device.

16 Claims, 12 Drawing Sheets

(56) References Cited

U.S. PATENT DOCUMENTS

| | | | |
|---|---|---|---|
| 9,098,333 | B1 | 8/2015 | Obrecht et al. |
| 9,117,074 | B2 | 8/2015 | Srivastava |
| 9,378,361 | B1* | 6/2016 | Yen .................... G06F 21/55 |
| 9,514,293 | B1* | 12/2016 | Moritz ................ G06F 21/316 |
| 9,516,053 | B1* | 12/2016 | Muddu .............. H04L 63/1425 |
| 9,607,507 | B1* | 3/2017 | McClintock ........... G08C 17/04 |
| 9,753,796 | B2* | 9/2017 | Mahaffey ............ G06F 11/0766 |
| 9,838,405 | B1* | 12/2017 | Guo .................... H04L 63/1416 |
| 10,326,778 | B2* | 6/2019 | Gong ................... G06F 21/561 |
| 2008/0168562 | A1* | 7/2008 | Haga ..................... G06F 21/14 726/23 |
| 2008/0178294 | A1* | 7/2008 | Hu ....................... G06F 21/552 726/24 |
| 2009/0293121 | A1* | 11/2009 | Bigus ................... G06F 21/316 726/22 |
| 2010/0169192 | A1 | 7/2010 | Zoldi et al. |
| 2011/0010633 | A1* | 1/2011 | Richmond .............. H04L 41/12 715/736 |
| 2011/0302656 | A1* | 12/2011 | El-Moussa ......... H04L 63/1425 726/24 |
| 2013/0254857 | A1 | 9/2013 | Bajenov et al. |
| 2015/0020187 | A1 | 1/2015 | Flowers et al. |
| 2015/0286820 | A1 | 10/2015 | Sridhara et al. |
| 2016/0019387 | A1 | 1/2016 | Sol et al. |
| 2016/0026796 | A1 | 1/2016 | Monrose et al. |
| 2016/0065594 | A1* | 3/2016 | Srivastava ......... H04L 63/1433 726/23 |
| 2016/0088000 | A1 | 3/2016 | Siva Kumar et al. |
| 2016/0132887 | A1 | 5/2016 | Lacoss-Arnold et al. |
| 2016/0335728 | A1* | 11/2016 | Pomer ................. G06Q 40/128 |
| 2017/0070775 | A1* | 3/2017 | Taxier ................. H04L 12/2825 |
| 2017/0149795 | A1* | 5/2017 | Day, II ................. H04L 63/101 |

OTHER PUBLICATIONS

Adhiya, et al., "Tracking and identification of suspicious and abnormal behaviors using supervised machine learning technique", In Proceedings of International Conference on Advances in Computing, Communication and Control, Jan. 23, 2009, pp. 96-99.

"Detecting 'unusual behavior' using machine learning with CouchDB and Python", Published on: Nov. 8, 2013 Available at: http://stackoverflow.com/questions/19698469/detecting-unusual-behavior-using-machine-learning-with-couchdb-and-python.

Cortes, et al., "Support-Vector Networks," Machine Learning, vol. 20, Issue 3, Sep. 1995, pp. 273-297.

Weston, et al., "Multi-class Support Vector Machines," Technical Report, CSD-TR-98-04, Royal Holloway, University of London, May 20, 1998, 10 pages.

"Support vector machine," retrieved from «https://en.wikipedia.org/wiki/Support_vector_machine», on Sep. 14, 2016, Wikepedia, 15 pages.

Safavian, et al., "A Survey of Decision Tree Classifier Methodology," Technical Report, TR-EE 90-54, Purdue Univrsity, Sep. 1990, 50 pages.

"Decision tree learning", «https://en.wikipedia.org/wiki/Decision_tree_learning», on Sep. 14, 2016, Wikepedia, 7 pages.

"Decision tree", «https://en.wikipedia.org/wiki/Decision_tree», on Sep. 14, 2016, from Wikepedia, 5 pages.

Ho, Tin Kam, "Random Decision Forests," In Proceedings of the Third International Conference on Document Analysis and Recognition, vol. 1, 1995, pp. 278-282.

Breiman, Leo, "Random Forests," Machine Learning, vol. 45, 2001, pp. 5-32.

"Random forest," retrieved from «https://en.wikipedia.org/wiki/Random_forest», on Sep. 14, 2016, from Wikepedia, 7 pages.

"Audit Logon," retrieved from «https://technet.microsoft.com/en-us/library/dd941635(v=ws.10).aspx», on Aug. 19, 2016, Microsoft TechNet; 2009, 2 pages.

"Audit Logoff," retrieved from «https://technet.microsoft.com/en-us/library/dd941621(v=ws.10).aspx», on Aug. 19, 2016, Microsoft TechNet; 2009, 1 page.

"Audit Other Logon/Logoff Events," retrieved from «http://www.tutorialspoint.com/unix_commands/auditd.htm», on Aug. 19, 2016, 2 pages.

"auditd—Unix, Linux Command," retrieved from «https://technet.microsoft.com/en-us/library/dd941621(v=ws.10).aspx», on Aug. 19, 2016, Microsoft TechNet; 2009, 2 pages.

"Chapter 7. System Auditing", retrieved from «https://access.redhat.com/documentation/en-US/Red_Hat_Enterprise_Linux/6/html/Security_Guide/chap-system_auditing.html», on Aug. 19, 2016, Redhat Customer Portal, 6 pages.

"Audit Process Creation," retrieved from «https://technet.microsoft.com/en-us/library/dd941613(v=ws.10).aspx», on Aug. 19, 2016, Microsoft TechNet; 2009, 1 page.

"Supervised learning," retrieved from «https://en.wikipedia.org/wiki/Supervised_learning», on Sep. 19, 2016, from Wikepedia, 7 pages.

* cited by examiner

US 10,534,925 B2

DETECTION OF COMPROMISED DEVICES VIA USER STATES

BACKGROUND

Users of electronic devices may typically be concerned with security as they engage in various personal or other sensitive activities.

SUMMARY

According to one general aspect, a system for controlling device security may include at least one hardware device processor, and one or more supervised learning models. A controller controls device security. The controlling includes obtaining a first set of device activity data indicating current device activity on a device. A second set of user activity data indicating a current activity state of one or more legitimate users of the device is obtained. It is determined whether the indicated current activity state of the one or more legitimate users indicates that at least one of the one or more legitimate users is in an active state on the device, or that none of the one or more legitimate users is in an active state on the device. A statistical fit of the indicated current device activity on the device, with the indicated current activity state of the one or more legitimate users, is determined, by a comparison with at least one of the one or more supervised learning models. A probability of occurrence of at least one device activity event that is indicated in the first set of device activity data, given the indicted current activity state of the one or more legitimate users, is determined. It is determined whether the determined probability is within a predetermined fitness threshold value. A security alert action is initiated, based on a result of the determination of the statistical fit indicating a compromised state of the device.

According to another aspect, management of device security is controlled. One or more statistical models are generated that include statistical probability information that is associated with determinations of compromised devices, the generating using supervised learning. The generating includes generating at least one first model that includes data describing one or more legitimate activities of the device during one or more legitimate user-active states, and generating at least one second model that includes data describing one or more legitimate activities of the device during one or more legitimate user-inactive states. A security status of the device is determined based on obtaining a first set of device current activity data indicating current device activity on the device, and checking the indicated current device activity against the one or more statistical models. A security alert action is initiated, based on a result of the checking indicating a compromised state of the device.

According to another aspect, a system may include at least one hardware device processor, and one or more feature sets. A controller controls device security. The controlling includes obtaining a plurality of signals indicating a current activity state of a user of a device and a current device activity on the device. It is determined whether the indicated current activity state of the user indicates that the current user is in an active state on the device, or in an inactive state on the device. A statistical fit of the indicated current device activity on the device, with the indicated current activity state of the user, is determined by a comparison with at least one of the feature sets. A probability of occurrence of at least one device activity event that is indicated in the obtained plurality of signals, given the indicted current activity state of the user, is determined. It is determined whether the determined probability is within a predetermined fitness threshold value. A security alert action is initiated, based on a result of the determination of the statistical fit indicating a compromised state of the device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The details of one or more implementations are set forth in the accompanying drawings and the description below. Other features will be apparent from the description and drawings, and from the claims.

DETAILED DESCRIPTION

I. Introduction

Figure 1:
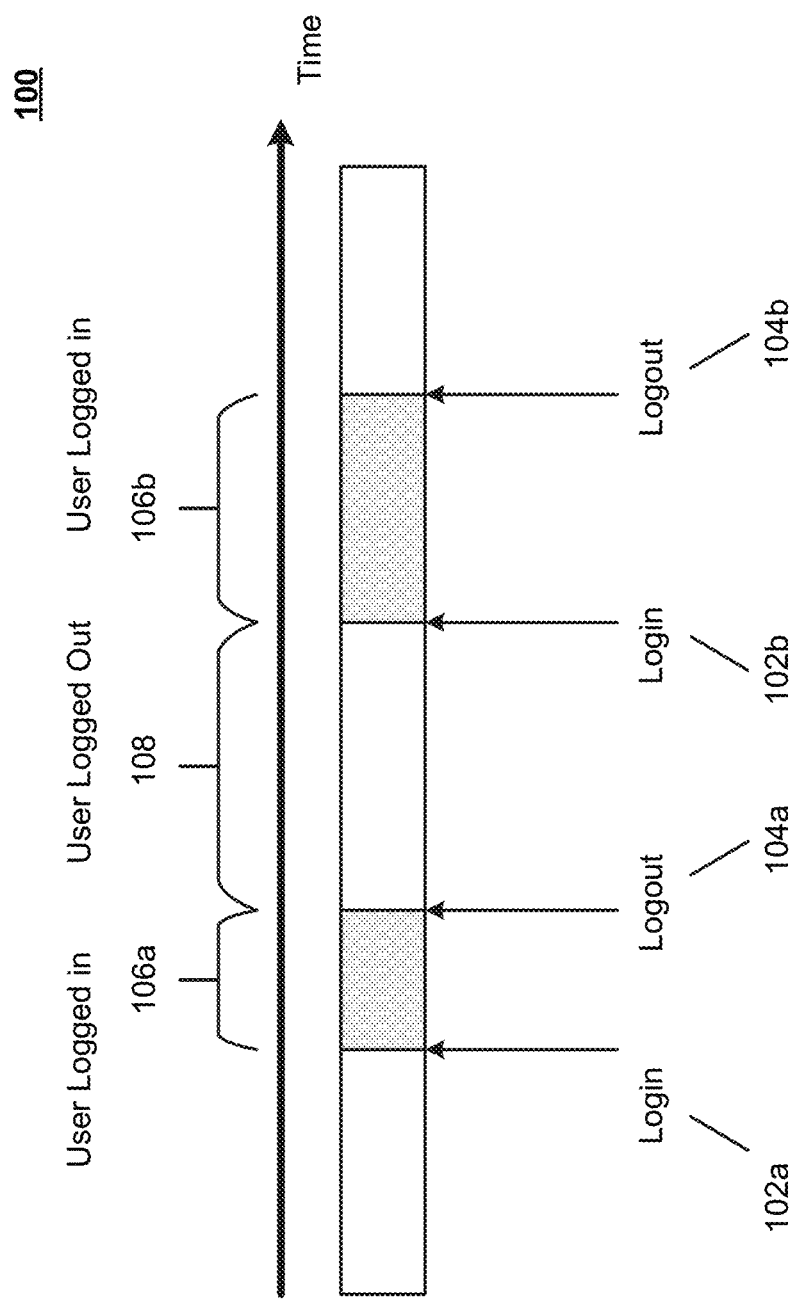
FIG. 1 illustrates an example timeline depicting example device activities for delineating user activity intervals and user inactivity intervals.

Substantial research has been invested worldwide to catch cyber attacks and to detect compromised machines. Such example techniques may include listening to network traffic, counting the number of failed logins to a specific user account, and many other techniques. However, due to the complexity of the problem there may be no one technique that catches all compromised activities.

In accordance with example techniques discussed herein, a compromised device may be detected by learning the device's system events behavior (e.g., via supervised learning techniques) when a user is active (e.g., logged in, screen is on, input device active, etc.) compared to when no user is active (e.g., no user is logged in, screen is off, input device inactive, etc.), and providing alerts and/or remedial actions when a suspicious system behavior is detected. For example, artificial intelligence models may be generated (e.g., classification models, anomaly detection models, etc.) using supervised learning techniques, for use in determining anomalous system events, based on events occurring during (distinguished) user active/inactive states. For example, statistical models generated as discussed herein may indicate probabilities of occurrences of various events (i.e., providing probabilities that the various events may happen). For example, the generated artificial intelligence models (e.g., classification models, anomaly detection models, etc.) may provide statistical probability information in response to requests for determinations of how probable is an observed occurrence, for use in determinations of compromised devices (or not compromised). Security alerts may be provided (e.g., via email, text, display, audio alert, etc.) for determinations of compromised devices (e.g., as well as remedial actions).

For example, after an attacker has managed to gain access to a victim's device, the attacker may start "working" on the device in order to achieve his/her goals. For example, the attacker may be just using the device's resources, or they may further steal data or engage in other malicious activities. Example techniques discussed herein may attempt to detect suspicious activity of the device in order to catch bridges.

When there is no user logged in to a device (e.g., a computer, handheld device, mobile phone, etc.), "human behavior" is not expected. For example, unexpected actions in this case may include a calculator launch or an internet browser application launch. Similarly, there are other events (e.g., operating system events) which are not expected. However, while a specific event (e.g., operating system (e.g., WINDOWS, LINUX, etc.) event) might be considered suspicious for one device, it may be considered normal for other devices. For example, a new zip.exe process creation event may be considered normal for one device but very suspicious to be created when no one is logged in (or no one is active) for another device.

For example, a technique for detection may determine whether certain events in a system happened due to user interaction, or the certain events happened by themselves (e.g., no user activity involved). An example technique for such detection may determine whether certain events in a system happened as a result of user interaction, and may also determine what happened when a user has disconnected (e.g., logged off). For example, if a process that normally involves user interaction was actually executed outside of a temporal interval when a user was actually active or logged in (e.g., when a user is not logged on to the device), this may be determined to be "suspicious" activity. For example, if a process is normally executed as a result of a user double-click (or other activating user activity), but the process is instead executing without such user input, and/or when a user is not even on the system, this may be determined to be "suspicious" activity.

The terms "logged off" and "logged out" may be used interchangeably herein. Similarly, the terms "logged on" and "logged in" may be used interchangeably herein.

Attackers, or non-legitimate users, have learned many techniques for penetrating systems, whether a legitimate user is currently active (e.g., logged in) or not. Example techniques discussed herein may differentiate between processes that are executed while a legitimate user is active (e.g., logged in), in contrast with processes that are executed when a legitimate user is inactive (e.g., logged off). In this context, "legitimate user" refers to a user who is authorized to utilize the device (or system).

For example, anomalies may be detected. For example, a system may determine a first group as the top 100 processes that may execute while a legitimate user is logged in (or active), and a second group as the top 100 processes that may be executed when a legitimate user is logged out (or inactive), and consider a difference of the two groups. For example, if it is determined that a new process is executed in either state (active or inactive), this event may be considered an anomalous situation (e.g., anomalous behavior by the system).

For example, an investigation may be performed to determine whether the new process execution is malicious activity. However, the anomalous system event may be determined as suspicious activity.

While the discussion above refers to "processes," the discussion is not limited only to processes, but may include other type of anomalous events (e.g., other signals that may be analyzed, or log files). For example, other security events of an operating system, or traffic data, may be analyzed in this context as well.

Further, a particular process may provide a wealth of features within that particular process. For example, an analysis may be performed to determine what parameters were being executed by the particular process, to determine suspicious activity. For example, it may be determined that if the particular process executes when a user is active (e.g., logged in), the particular process may (substantially) always be executed with a certain set of parameters. For example, it may also be determined that, when the user is logged off (inactive), the particular process may (substantially) always be executed with a different set of parameters. For this example, an anomaly may be determined if the user is inactive (e.g., logged out) and there is a "logged in" (or "user active") behavior exhibited by the particular process.

For example, other distinguishing differences may be detected based on a user level, or on a type of user (e.g., within an organization), or any other type of attribute that may give rise to indicators of anomalous system behavior.

By way of example, a user may log in to a device, and may open a browser. When the user logs out, there may be no legitimate reason for the browser to execute (while the user is logged out). If an attacker (non-legitimate user) waits for nightfall (when a legitimate user may be expected to log out and go to sleep for the night), the attacker may infiltrate the device (e.g., without actually logging in). For example, when exploiting software, the attacker may evade the login process. For example, the attacker may decide to execute an application (e.g., the browser), for example, to pull in some information. The resulting system behavior may be determined as suspicious activity (user sleeping, inactive/logged out—and browser being executed while in the "user inactive" or "logged out" state). This particular system behavior may be determined as an "outlier," in terms of expected system behavior while in this state. As explanation, it may be determined that, in this state, the browser should not be run while the user is logged out, but it is observed that the browser is executed anyway, leading to a determination of anomalous system behavior. Thus, an analysis may note events occurring while the user was logged in, and events that occurred when the user logged out.

As another example, a user may visit a web site and may (inadvertently) download malware (malicious software) that is configured to execute ten hours after the download. For example, the user may thereafter log out (and go home). If it is observed that, in this state, the system suddenly awakens and starts execution of the malicious activities, it may be desirable to catch this anomalous system behavior.

For example, if this behavior were instead initiated while the user was logged in, the behavioral events may filter through other system noise occurring due to "normal" system events during user login. However, this type of system event may be more easily determined as not desirable on the device, in a state determined as "after the user has logged out."

For example, activities that may be expected to occur on a device after a user has logged out (or is inactive) may include an operating system (OS) check for OS updates (or other legitimate software updates), and/or communications of some application with servers, such that it may not be a requirement that a user be logged in for the communications to occur. However, there may be specific entities (e.g., viruses) that should not operate in the "user logged out" state—and that may be immediately determined as an outlier in determinations of system behavior.

As another example, it may be determined which other machines/devices that a particular device would legitimately be communicating with, and it may be swiftly determined to block suspicious IP addresses (i.e., not one that is normally communicated with by a particular user/device/process).

For example, attackers may inject commands into a blog, with malicious intent. Example techniques discussed herein may include analyzing system traffic, and may determine that a blog is being read at an unexpected time, or that a blog is being read when a user is inactive (or not logged in to the device), which may result in a determination of suspicious activity (and may result in providing an alert).

For example, virus authors may be sufficiently sophisticated to prefer to operate when users are logged out of their systems (to try to avoid being noticed). Such virus authors may assume that their activities might be noticed if they are operating while a user is logged in. In accordance with example techniques discussed herein, models may be generated and updated, not only for the processes, but also for IP addresses (and other entities).

For example, if a user, when logged in, only (or substantially "only"—with rare exceptions) communicates with specific IP addresses (or specific countries or geographic regions/locales), a model may include such information as "normal" activity during a "logged in" state. For example, the system may also observe that the user is typically communicating with the specific addresses between 10 a.m. and 6 p.m. (e.g., during work hours). As an example, a user may communicate substantially only with other devices in Redmond, Wash., or New York, or Europe during work hours for that user.

For example, the user may log out, and malware on the device may wake up and start communicating with devices in new, or different, countries (e.g., Africa, Asia). Example techniques discussed herein may differentiate between what happened when the user was logged in and what happened after the user logged out, to determine the communications made in the "logged out" state as a substantial outlier.

As used in this context, the term "outlier" refers to an event or entity whose probability of existence/occurrence over a predetermined number of days (or devices), or a predetermined number of combinations of days (and/or devices), is lower than a predetermined threshold value. For example, the predetermined threshold value may be a parameter of a particular system.

In an example implementation, a plurality of devices may be determined as having different types (e.g., 3 types of devices A, B, C). Processes that run on the different types may be determined, and clustering may be performed on the processes that are run on each different device type. For example, analyses may then be run on each cluster.

For example, it may be determined (by such an analysis) that a first group of processes are run on type A devices substantially all the time, but are run on type B devices only when they are in a "user logged out" or "inactive user" state (e.g., for various reasons). Such differentiations may aid in not blurring analysis results (e.g., avoiding putting all users/devices in the same bin). For example, devices may be separated into client devices and server devices (which may each embody very different characteristics). For example, an outlier may then be determined for a first one of the devices in a "user logged out" state. For example, the outlier (e.g., anomalous event) may be considered anomalous for the cluster to which the first device belongs (via the classification and clustering discussed above), but may be considered a "normal" event for another one of the clusters. For example, such an outlier may not be determined if the analysis had been performed on all of the devices together (e.g., without generating the clusters prior to the analysis). That is, with clustering, it may be possible to expose more fine-grained system/device behaviors for closer analysis.

In accordance with example techniques discussed herein, an example implementation is discussed below. There may be other implementations of the example techniques, and thus the example implementation discussed below is not intended to limit the concepts discussed herein. The example discussed below involves determining whether a user is logged in on a device, or not logged in. However, the example techniques may also be applied to determining other states such as user activity/inactivity.

In accordance with example techniques discussed herein, a set of device states may be defined as:
 (1) A certain user is logged in and may be performing manual work on the device. Each respective particular user defines a separate respective state.
 (2) The device is turned on and doing what it is expected to do, e.g., running system processes, but no one is logged in. This is another state.

An example profiling technique is discussed below.
For each device, N+1 states are created, for:
user1, user2, . . . , userN
 and a state of noUserLogged.

For this particular implementation, the user's login/logout points may be used to distinguish between the states.

For example, as shown in FIG. 1, a timeline 100 is illustrated, depicting example temporal user login points 102a, 102b, and user temporal logout points 104a, 104b. FIG. 1 further depicts example user logged in temporal intervals 106a, 106b and an example user logged out temporal interval 108. As discussed above, other types of activities may also delimit active/inactive states, and thus this example is not intending to limit the discussion only to logged-in/logged-out states.

For example, the distinctions illustrated in the example of FIG. 1 may be realized by using WINDOWS security events as 4778/4779 (RDP session started/ended) or 4624/4634/4647 (account logged in/logged off). Further as discussed above, other operating systems may be used, for detecting such activity/inactivity of users and/or devices.

For example, a statistical profile (or feature set) may be generated so that each profile is defined by its activities. Then, the probability for an activity to occur in each state may be determined. In this context, a "profile" or "feature set" refers to a set of data describing the significant features of a particular entity. For example, a profile, or feature set, may represent the extent to which the particular entity exhibits traits or abilities as indicated by statistical models generated by supervised learning techniques.

For this particular implementation (of FIG. 1), the activities to be monitored may include:
 Audit log was cleared (Signal: WINDOWS security event 1102)
 Each process name will be translated to a separate activity (Signal: WINDOWS security event 4688)
 Each WINDOWS security event type (ID) will be translated to an activity (Signal: all WINDOWS security events)

Each security alert will be translated to a separate activity (Signal: AZURE Security Alert (ASC) alerts)
traffic of each open port (Signal: network data)

An example detection technique is discussed below.

An example detection engine may run every [parameter] hours and may compare the new activities' occurrences to the devices' profiles. For example, the comparison may be accomplished by determining the probability of the activity to occur, given current profiles. If the probability is low enough (e.g., lower than a predetermined threshold value, by comparing the probability against the threshold), then an alert may be raised. For example, a user or system administrator may be provided with a message. Further, one or more protective/remedial actions may be initiated (e.g., the device may be locked, etc.). Then, the profiles may be updated with the new data (e.g., such that the new data may have greater weight than the historical data).

An example presentation technique (e.g., for alerts) is discussed below.

When a suspicious behavior is detected, an alert may be sent to the user (e.g., a device owner or organizational administrator), for example, via AZURE SECURITY CENTER and/or e-mail.

For example, the message content may include information regarding (1) the host, (2) the suspicious activity, for example a suspicious log clear or a suspicious svchost.exe new process creation, and/or (3) the reason it may be considered a suspicious activity.

In accordance with example techniques discussed herein, compromised devices may be detected using, at least, comparisons between (1) user activity on a device (e.g., the behavior of a device when a user is logged in) and (2) user inactivity on a device (e.g., the behavior of the device when no user is logged in). As discussed above, other distinctions (i.e., other than user logged-in/logged-out distinctions) may also be utilized.

For example, such detecting may include, at least:
(1) Training classifiers to predict whether behavior exhibited is more probable for an active state or an inactive state (e.g., a logged in or logged out state).
(2) Performing clustering to distinguish between two main types of device behavior (active or inactive, e.g., logged in and not logged in).
(3) Deterministic rules to do the same
(4) A privacy management component that allows the device user to determine which signals are to be/not be used for the purpose of this analysis.

Figure 2:
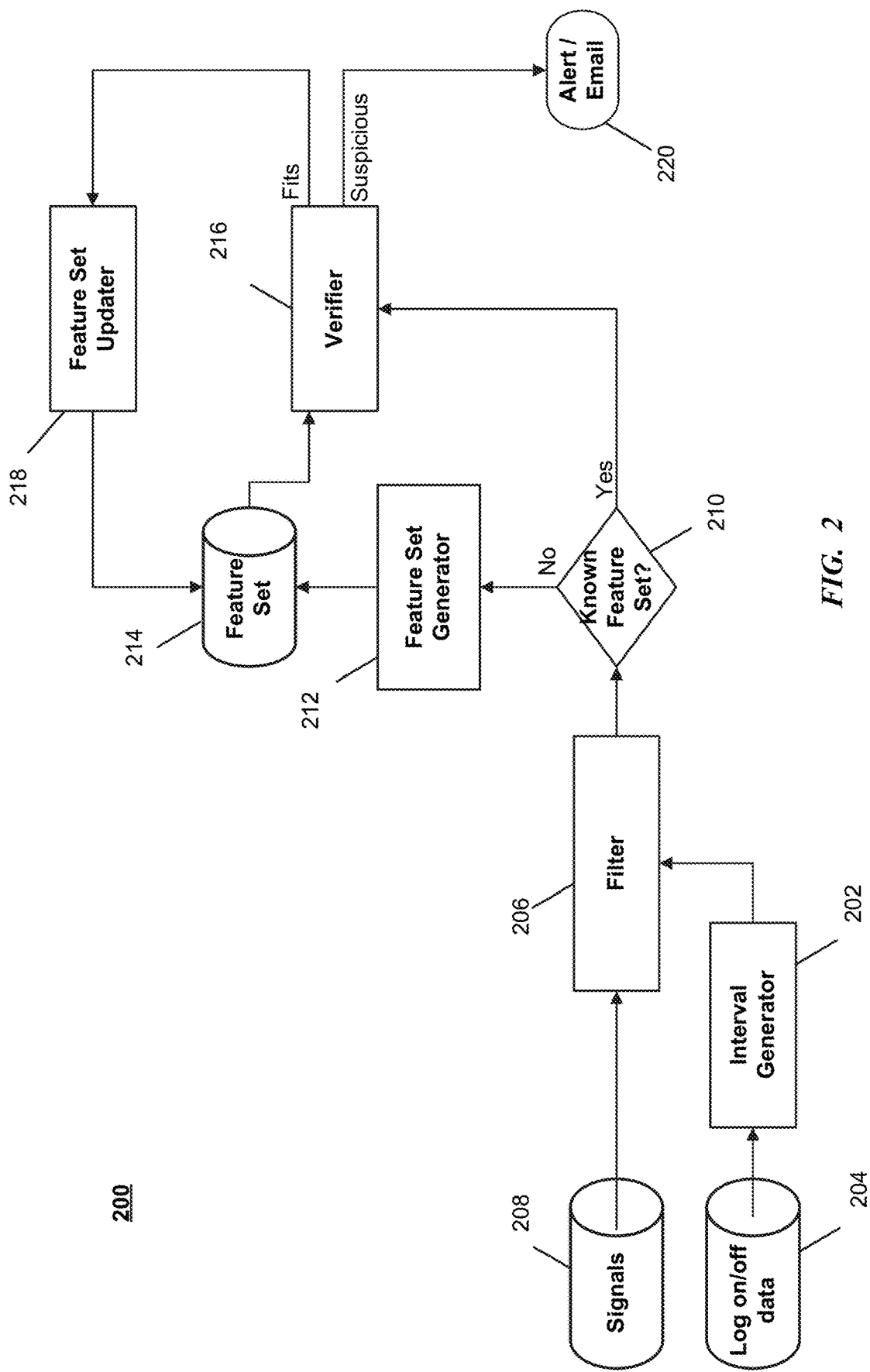
FIG. 2 depicts an example system flow of an example system for detecting compromised statuses of devices.

FIG. 2 depicts an example system flow 200 of an example implementation, in accordance with the example techniques discussed herein. While the example shown in FIG. 2 utilizes login/logoff data, it is to be understood that other distinctions may be used to determine states of the device, as discussed further herein.

As discussed below, the example of FIG. 2 illustrates, as a non-limiting example, obtaining the log on/off data to learn what states may be built. For example, if the device includes a desktop device, the states may include one state for each user and one more states that indicate that no user is logged in. For example, if the device includes a mobile device, the states may include (at least) two device states depicting active/inactive states. For example, a mobile device may be considered as being in an "inactive" state if a user has not touched the display (or provided audio input) for at least a predetermined threshold period of time. For example, if the screen of the device is off, an "inactive" state may be determined. For example, if a user's mobile phone is currently not being used (e.g., in the user's purse, backpack, or pocket), and suddenly a payment for a muffin with coffee (e.g., with caramel, chocolate, whipped cream, nuts, etc.) purchase is initiated at a coffee shop (allegedly with the user's phone), the anomaly may be detected and an alert may be provided to the user (e.g., siren sound, buzz vibration, text, etc.) to alert him/her of imminent fraudulent use of their device.

For example, if the device includes a multi-state machine, the states may be represented by user states or by any other distinction. For example, such distinctions may include (1) ranges of CPU usage, (2) whether a display is on or off, (3) whether an input device (e.g., touch input device, keyboard, mouse, audio input device, camera, etc.) is in use or not.

An example modeling technique is discussed below.

As shown in the example of FIG. 2, an interval generator 202 may obtain logon/logoff data 202 (e.g., via logon/logoff events) and may determine the relevant temporal (i.e., time) intervals, e.g., for a current feature set. For example, a current "profile" or "feature set" may include information pertaining to various entities (e.g., a profile associated with a user, a profile associated with a particular state, etc.). For example, a filter 206 may obtain these temporal intervals, e.g., in addition to data of new signals 208, e.g., signals that occurred within the state temporal interval. The filter 206 may, for example, keep signals that occurred within the state (within the temporal interval), and may filter out data of other feature sets (e.g., as irrelevant data). A determination 210 may be made to determine whether the current feature set is new (e.g., the login belongs to, or is associated with, an unfamiliar state/user). If yes, a feature set generator 212 (e.g., profile generator) may obtain the data and create a new feature set 214 based on that data. Otherwise, the data is sent to a verifier 216 that determines whether the signals fit to the current feature set (e.g., given a predetermined confidence threshold value for the confidence level). For example, the verifier 216 may determine whether the signals fit sufficiently to behavior associated with the current feature set (e.g., in accordance with a predetermined threshold value, to determine the "fit"). If the verifier 216 determines a fit, the data is sent to a feature set updater 218, which may update the current feature set using the data. For example, data associated with signals that are determined to not fit the current feature set may be used to provide, to the user, an alert 220 (e.g., a security alert), e.g., via email, or any other desired option of treatment for compromise detection. As discussed above, one or more remedial (or protective) actions may be initiated, in addition to (or in lieu of) the alert 220.

In an example implementation, logins/logouts (e.g., the logon/logoff data 202 of FIG. 2) may be identified, as discussed below.

Table 1 shown below indicates an example operating system (e.g., WINDOWS) audit logon security policy setting, which determines whether the operating system generates audit events when a user attempts to log on to a computer. These events are related to the creation of logon sessions and occur on the computer that was accessed. For an interactive logon, events are generated on the computer that was logged on to. For network logon, such as accessing a shared resource, events are generated on the computer hosting the resource that was accessed.

As shown in the example of Table 1, the following events may be recorded: (1) logon success and failure; (2) logon attempts by using explicit credentials (e.g., this event is generated when a process attempts to log on an account by explicitly specifying that account's credentials); and (3)

security identifiers (SIDs) are filtered. If this policy setting is configured, the events shown in Table 1 may be generated.

TABLE 1

| Event ID | Event message |
|---|---|
| 4624 | An account was successfully logged on |
| 4625 | An account failed to log on |
| 4648 | A logon was attempted using explicit credentials |
| 4675 | SIDs were filtered |

Table 2 shown below indicates an example operating system (e.g., WINDOWS) audit logoff security policy setting, which determines whether the operating system generates audit events when logon sessions are terminated. These events occur on the device that was accessed. For example, in the case of an interactive logon, these may be generated on the device to which a user logged on.

As shown in the example of Table 2, the following events may be recorded: (1) an account was logged off; and (2) user initiated logoff.

TABLE 2

| Event ID | Event message |
|---|---|
| 4634 | An account was logged off |
| 4647 | User initiated logoff |

Table 3 shown below indicates an example operating system (e.g., WINDOWS) audit logon security policy setting, which determines whether the operating system (e.g., WINDOWS) generates audit events for other logon or logoff events, such as: (1) a remote desktop session disconnects or connects; (2) a workstation is locked or unlocked; (3) a screen saver is invoked or dismissed; (4) a replay attack is detected; (5) a user is granted access to a wireless network (e.g., this can be a user account or the computer account); and/or (6) a user is granted access to a wired 802.1x network (e.g., this can be a user account or the computer account). If this policy setting is configured, the events shown in Table 3 may be generated.

TABLE 3

| Event ID | Event message |
|---|---|
| 4649 | A replay attack was detected |
| 4778 | A session was reconnected to a WINDOW Station |
| 4779 | A session was disconnected from a WINDOW Station |
| 4800 | The workstation was locked |
| 4801 | The workstation was unlocked |
| 4802 | The screen saver was invoked |
| 4803 | The screen saver was dismissed |
| 5378 | The requested credentials delegation was disallowed by policy |
| 5632 | A request was made to authenticate to a wireless network |
| 5633 | A request was made to authenticate to a wired network |

As another example, for a LINUX system, the following rule to may be added to audited:
 -w<LOG FILE>-p wa -k logins Table 4 shown below indicates an example operating system (e.g., WINDOWS) audit process creation security policy setting, which determines whether the operating system generates audit events when a process is created (starts) and the name of the program or user that created it. For example, these audit events may aid in understanding how a device is being used and in tracking user activity.

TABLE 4

| Event ID | Event message |
|---|---|
| 4688 | A new process has been created |
| 4696 | A primary token was assigned to a process |

As another example, for a LINUX system, the following rule to may be added to audited:
 -a exit,always -F arch=b64 -S execve -F auid>=1000 -F auid!=4294967295 -k proclaunches As discussed above, a privacy management component (or module, or interface) may allow a device user to control (e.g., by selection) which signals are to be/not be used for the purpose of analysis (e.g., in generating/updating the profile discussed above). As discussed below, FIG. 4 depicts an example graphical user interface 400 illustrating selectable entities that a user may select (or not), to provide user permissions (or not) to use values of the entities in generating/updating profiles.

Figure 3:
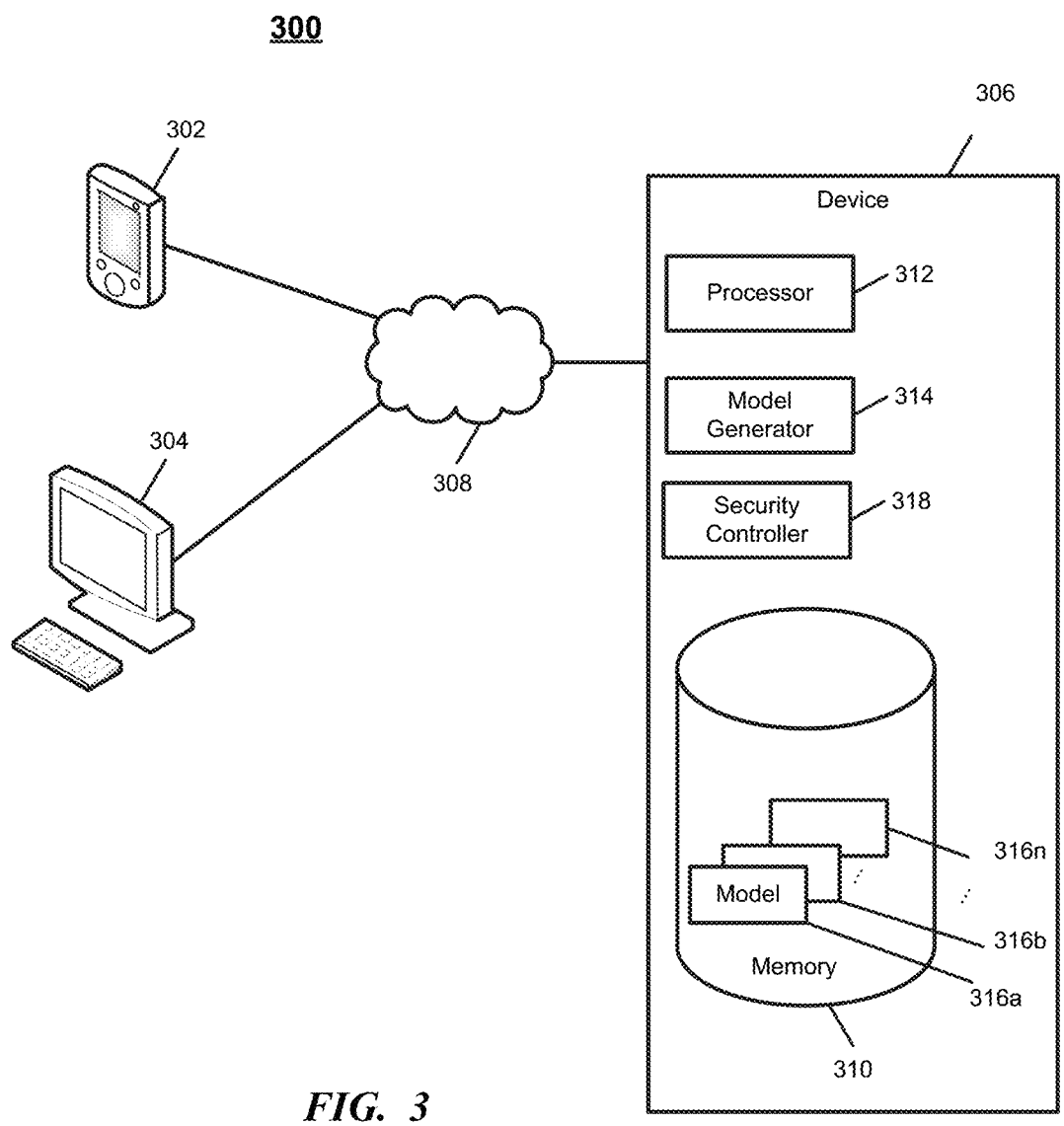
FIG. 3 illustrates an example model generator for an example system for detecting compromised statuses of devices.

FIG. 3 is a block diagram of an example system 300 for controlling device security. Users at devices 302, 304, 306 may communicate with other devices via network 308. Applications on device 306 may be provided by instructions stored in memory 310 (e.g., a hardware memory) and executed on processor 312. A model generator 314 may generate models 316a, 316b, . . . , 316n, using one or more supervised learning techniques, that may be used for the example analysis discussed above. For example, the models 316a, 316b, . . . , 316n may include at least one artificial intelligence model (e.g., classification model, anomaly detection model, etc.), and may provide statistical probability information in response to requests for determinations of how probable is an observed occurrence, for use in determinations of compromised devices (or not compromised). In accordance with example techniques discussed herein, the supervised learning may be accomplished via techniques such as decision trees, random forests, and/or support vector machines; however, other techniques/variations may also be used. A security controller 318 may control device security, in accordance with the example techniques discussed further herein.

As used herein, "automated," or "automatically" refers to events that may occur without human intervention.

Figure 4:
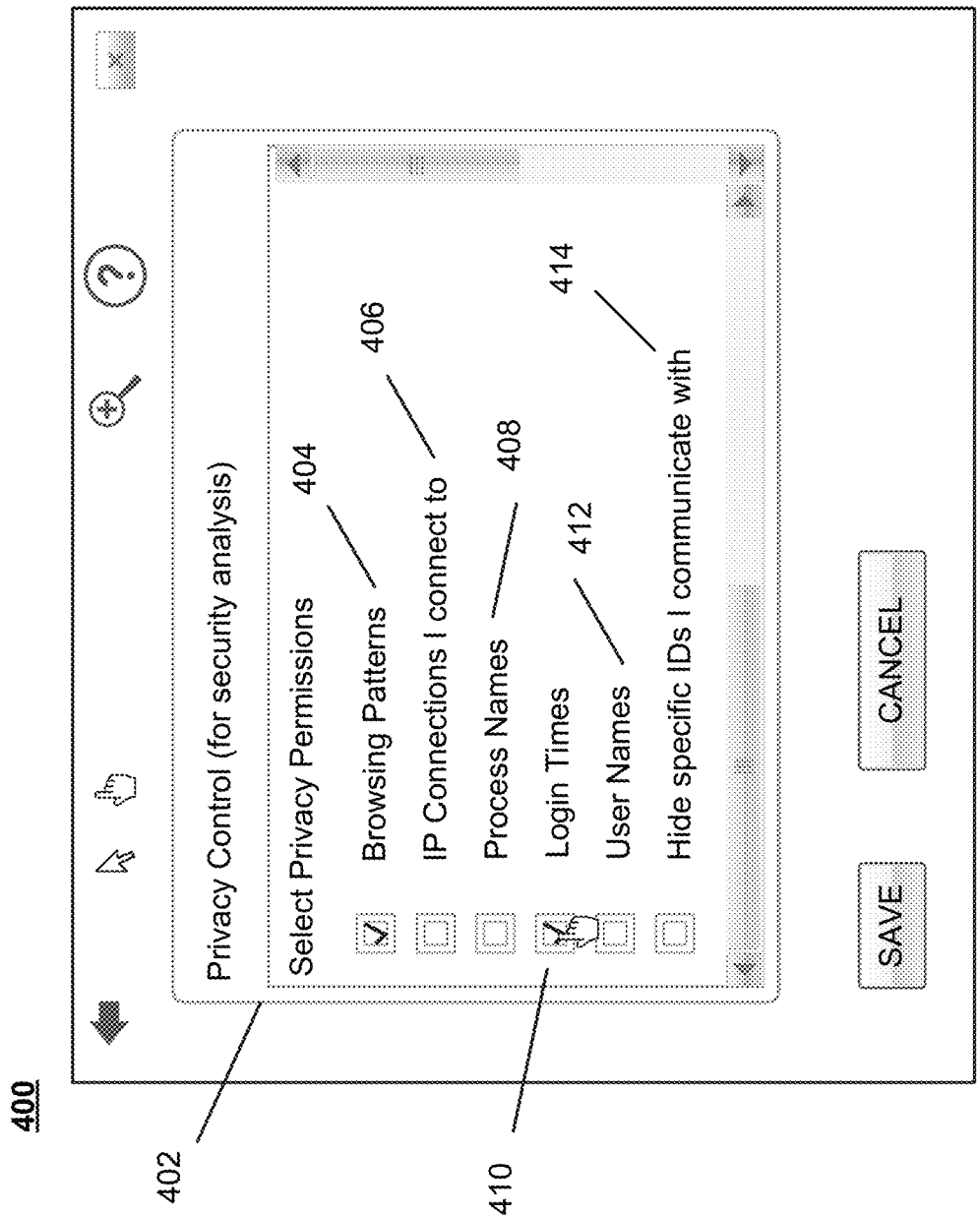
FIG. 4 illustrates an example privacy control input display for an example system for detecting compromised statuses of devices.

As shown in FIG. 4, an example privacy control input display 402 is illustrated, enabling a user to select privacy permissions. As shown in FIG. 4, example selectable privacy permissions may include user browsing patterns 404, IP connections to which the user connects 406, process names 408, login times 410, user names 412, and an option to hide specific IDs with which the user communicates 414. For example, the user may also be provided with an option to hide specific types of IDs with which the user communicates. While the example of FIG. 4 illustrates these (limited) examples, it is to be understood that other (e.g., different) examples may also be used, and that more (or fewer) options may also be provided to the user. For example, active/inactive states may be presented as options, and may further include finer grained details of options that the user may select (or not). For example, the user may be enabled to opt in or opt out of permissions to use many different types of information for the security analyses.

While the example of FIG. 4 illustrates a graphical user interface with check boxes, it is to be understood that many other input techniques may be used to obtain user input with regard to the permissions. For example, audio input/output may be used, as well as other input/output techniques for user selections/permissions.

Generally, "supervised learning" refers to a machine learning task of inferring a function from labeled training data. The training data may include a set of training examples. For example, in supervised learning, each example may include a pair: an input object (e.g., as a vector) and a desired output value (e.g., a supervisory signal). For example, a supervised learning technique (e.g., an algorithm) may analyze the training data and generate an inferred function, which may be used for mapping new examples. For example, an algorithm may determine the class labels for unseen instances.

As an example, solving a given problem of supervised learning may include:
(1) Determine the type of training examples (e.g., determine what kind of data is to be used as a training set).
(2) Assemble a training set. (e.g., a set of input objects may be obtained, as well as corresponding outputs)
(3) Determine the input feature representation of the learned function (e.g., the input object may be transformed into a feature vector, may include a number of features that are descriptive of the object).
(4) Determine the structure of the learned function and corresponding learning algorithm (e.g., support vector machines, decision trees, etc., may be used).
(5) Run the learning algorithm on the obtained training set.
(6) Evaluate the learned function (e.g., after parameter adjustment and learning, the performance of the resulting function may be measured on a test set).

For example, a machine may be taught (e.g., via supervised learning techniques) to differentiate (distinguish) between when a user is active (e.g., logged in) and when the user is inactive (e.g., logged out). For example, the machine may be taught based on examples of devices that are assumed to be, most of the time, not compromised. Thus, the "not compromised" devices (by assumption, initially) may be taught a learning technique (e.g., an algorithm). Examples may then be used to teach the machine. The examples may also be refreshed periodically, as needed or desired. Examples from (1) when a user is active, or logged in; and (2) when the user is inactive, or logged out, may be used to teach the machine. The machine(s) may be taught how the features discussed above (e.g., IPs devices talking to, process names, process parameters, etc.) behave when a user is active (e.g., logged in), and when the user is inactive (e.g., logged out). The machine may then generate one or more models.

For example, when a new device is added, it may be tested against previously generated data, to derive probability values for a user being active or inactive. The resulting probability may then be checked against real data that is currently being received by the device. If it is determined, based on current system behavior data, that the probability of a user being active (e.g., logged in) is 90% (as an example), and that information coming in the current data indicates that no one has actually logged in to the device, then anomalous system behavior may be reported. Remedial steps may then be taken, to try to eliminate malicious exploitation of the device by attackers.

In accordance with example techniques discussed herein, the supervised learning may be accomplished via techniques such as decision trees, random forests, and/or support vector machines; however, other techniques/variations may also be used.

Decision tree learning uses a decision tree as a predictive model which maps observations about an item to conclusions about the item's target value. Tree models where the target variable can take a finite set of values may be referred to as classification trees. In these tree structures, leaves may represent class labels and branches may represent conjunctions of features that lead to those class labels.

In decision analysis, a decision tree may be used to visually and explicitly represent decisions and decision making. In data mining, a decision tree may describe data but not decisions; rather the resulting classification tree can be an input for decision making.

A decision tree is a decision support tool that uses a tree-like graph or model of decisions and their possible consequences, including chance event outcomes, resource costs, and utility. Decision trees may be used, for example, in decision analysis, to help identify a strategy most likely to reach a goal, but may also be used in machine learning.

A decision tree is a flowchart-like structure in which each internal node represents a "test" on an attribute (e.g., whether a coin flip comes up heads or tails), each branch represents the outcome of the test and each leaf node represents a class label (decision taken after computing all attributes). The paths from root to leaf may represent classification rules.

Random forests or random decision forests are an ensemble learning method for classification, regression and other tasks, that operate by constructing a multitude of decision trees at training time and outputting the class that is the mode of the classes (classification) or mean prediction (regression) of the individual trees. For example, random decision forests may correct for decision trees' overfitting to their training set. An example algorithm for random decision forests uses the random subspace method, which may implement a "stochastic discrimination" approach to classification.

In machine learning, support vector machines (also support vector networks) are supervised learning models with associated learning algorithms that analyze data used for classification and regression analysis. Given a set of training examples, each marked for belonging to one of two categories, an SVM training algorithm builds a model that assigns new examples into one category or the other, so that it may thus be considered a non-probabilistic binary linear classifier. An SVM model may be a representation of the examples as points in space, mapped so that the examples of the separate categories are divided by a clear gap that is as wide as possible. New examples may then be mapped into that same space and predicted to belong to a category based on which side of the gap they fall on.

II. Example Operating Environment

Features discussed herein are provided as example techniques that may be implemented in many different ways that may be understood by one of skill in the art of computing, without departing from the discussion herein. Such features are to be construed only as example features, and are not intended to be construed as limiting to only those detailed descriptions.

Figure 5:
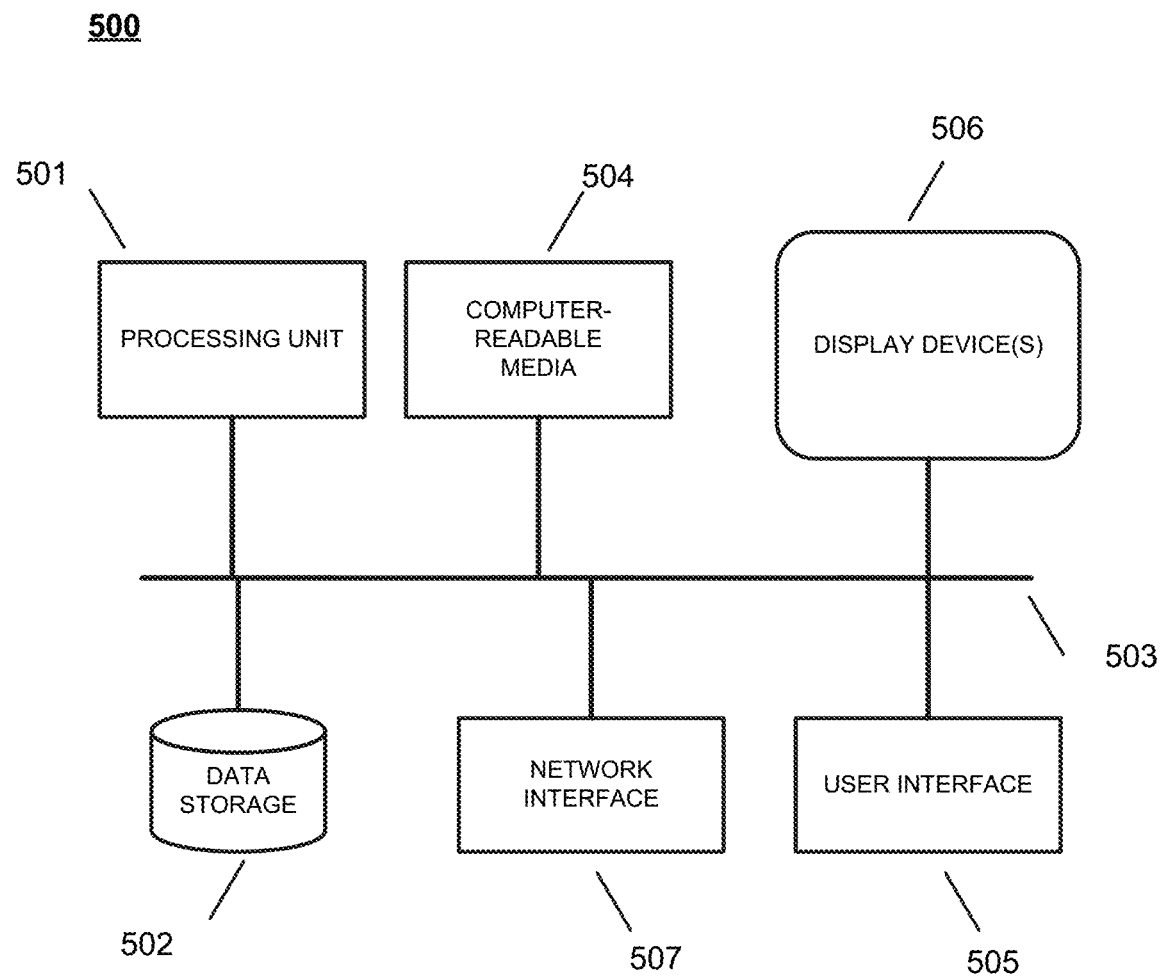
FIG. 5 is a block diagram of an example architecture for an example system for detecting compromised statuses of devices.

FIG. 5 illustrates an example of a suitable computing and networking environment 500 on which the examples of FIGS. 1-4 may be implemented. The computing system environment 500 is only one example of a suitable computing environment on which aspects of the subject matter discussed herein may be implemented and is not intended to suggest any limitation as to the scope of use or functionality of the subject matter discussed herein. Example techniques discussed herein may be operational with numerous other general purpose or special purpose computing system environments or configurations. Examples of well-known computing systems, environments, and/or configurations that may be suitable for use with the subject matter discussed herein include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

Example techniques discussed herein may be described in the general context of computer-executable instructions, such as program modules, being executed by a computer. Generally, program modules may include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media, including, for example, memory storage devices (e.g., hardware memory storage devices).

With reference to FIG. 5, an example system for implementing various aspects may include a computing device in the form of a computing system environment 500. The computing system environment 500 is only one example of a suitable computing environment and is not intended to suggest any limitation as to the scope of use or functionality of aspects of the subject matter discussed herein.

Aspects of the subject matter discussed herein are operational with numerous other general purpose or special purpose computing system environments or configurations. Examples of well-known computing systems, environments, or configurations that may be suitable for use with aspects of the subject matter described herein comprise personal computers, server computers—whether on bare metal or as virtual machines—, hand-held or laptop devices, multiprocessor systems, microcontroller-based systems, set-top boxes, programmable and non-programmable consumer electronics, network PCs, minicomputers, mainframe computers, personal digital assistants (PDAs), gaming devices, printers, appliances including set-top, media center, or other appliances, automobile-embedded or attached computing devices, other mobile devices, phone devices including cell phones, wireless phones, and wired phones, distributed computing environments that include any of the above systems or devices, and the like. While various embodiments may be limited to one or more of the above devices, the term computer is intended to cover the devices above unless otherwise indicated.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Alternatively, or in addition, the functionality described herein may be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and the like.

Example components may include, but are not limited to, various hardware components, such as processing unit 501, data storage 502, such as a system memory, and system bus 503 that couples various system components including the data storage 502 to the processing unit 501. The system bus 503 may be any of several types of bus structures including a memory bus or memory controller, a peripheral bus, and a local bus using any of a variety of bus architectures. By way of example, and not limitation, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus, Peripheral Component Interconnect Extended (PCI-X) bus, Advanced Graphics Port (AGP), and PCI express (PCIe).

The system memory (e.g., hardware memory) may include computer storage media in the form of volatile and/or nonvolatile memory such as read only memory (ROM) and random access memory (RAM). Nonvolatile memory may be substituted for some or all of the ROM and/or the RAM. For example, memristor memory, phase-change memory (PCM), or some other type of nonvolatile memory may be used instead of, or in addition to, the ROM and/or the RAM.

The computer 500 may include a variety of computer-readable media 504. Computer-readable media 504 may be any available media that can be accessed by the computer 500 and may include both volatile and nonvolatile media, and removable and non-removable media, but is not implemented as propagated signals per se. Thus, as used herein, the term "computer-readable storage medium" is not a signal per se, nor any type of propagating signal per se.

By way of example, and not limitation, computer-readable media 504 may comprise computer storage media and communication media. Computer storage media includes volatile and nonvolatile, removable and non-removable media implemented in any method or technology for storage of information such as computer-readable instructions, data structures, program modules or other data. Computer storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by the computer 500. Communication media may embody computer-readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media. Computer-readable media may be embodied as a computer program product, such as software stored on computer storage media.

The data storage or system memory 502 may include computer storage media in the form of volatile and/or nonvolatile memory such as read only memory (ROM) and random access memory (RAM). A basic input/output system (BIOS), containing the basic routines that help to transfer information between elements within computer 500, such as during start-up, may be stored in ROM. RAM may contain data and/or program modules that are immediately accessible to and/or presently being operated on by processing unit 501. By way of example, and not limitation, data storage 502 may store an operating system, application programs, and other program modules and program data.

Data storage 502 may also include other removable/non-removable, volatile/nonvolatile computer storage media. By way of example only, data storage 502 may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The drives and their associated computer storage media, described above and illustrated in FIG. 5, may provide storage of computer-readable instructions, data structures, program modules and other data for the computer 500.

A user may enter commands and information through a user interface 505 or other input devices such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs using hands or fingers, or other natural user interface (NUI) may also be used with the appropriate input devices, such as a microphone, camera, tablet, touch pad, glove, or other sensor. These and other input devices may be connected to the processing unit 501 through a user input interface 505 that is coupled to the system bus 503, or may be connected by other interface and bus structures, such as a parallel port, game port or a universal serial bus (USB). One or more display devices 506 (e.g., a monitor) may also be connected to the system bus 503 via an interface, such as a video interface. The display device(s) 506 may also be integrated with a touch-screen panel or the like. For example, a monitor and/or touch screen panel may be physically coupled to a housing in which the computing device 500 is incorporated, such as in a tablet-type personal computer. In addition, computers such as the computing device 500 may also include other peripheral output devices such as speakers and printers, which may be connected through an output peripheral interface or the like.

The computer 500 may operate in a networked or cloud-computing environment using logical connections 507 to one or more remote devices, such as a remote computer. The remote computer may be a personal computer, a server, a router, a network PC, a peer device or other common network node, and may include many or all of the elements described above relative to the computer 500. The logical connections depicted in FIG. 5 may include one or more local area networks (LANs) and one or more wide area networks (WANs), but may also include other networks. Such networking environments may be used in offices, enterprise-wide computer networks, intranets and the Internet.

When used in a networked or cloud-computing environment, the computer 500 may be connected to a public or private network through a network interface or adapter 507. In some embodiments, a modem or other means may be used for establishing communications over the network. A modem, which may be internal or external, may be connected to the system bus 503 via the network interface 507 or other appropriate mechanism. A wireless networking component, which for example may include an interface and antenna, may be coupled through a suitable device such as an access point or peer computer to a network. In a networked environment, program modules depicted relative to the computer 500, or portions thereof, may be stored in the remote memory storage device. It may be appreciated that the network connections shown are merely examples, and other means of establishing a communications link between the computers may be used.

In this context, a "processor" may include a single processor or multiple processors configured to process instructions associated with a computing system. A processor may thus include one or more processors executing instructions in parallel and/or in a distributed manner. For example, the system shown in FIG. 5 may include one or more processors (e.g., hardware processors).

For example, a system may include at least one hardware device processor, and a computer-readable storage medium (e.g., an article of manufacture) storing executable instructions for execution by the device processor, for implementing example techniques as discussed herein.

For example, a system may include at least one hardware device processor, and a computer-readable storage medium storing executable instructions that, when executed, cause one or more of the at least one hardware device processor to control management of device security.

One skilled in the art of computing will appreciate that many different techniques may be used for implementing features discussed herein.

Aspects of the subject matter discussed herein are operational with numerous other general purpose or special purpose computing system environments or configurations. Examples of well-known computing systems, environments, or configurations that may be suitable for use with aspects of the subject matter described herein comprise personal computers, server computers—whether on bare metal or as virtual machines—, hand-held or laptop devices, multiprocessor systems, microcontroller-based systems, set-top boxes, programmable and non-programmable consumer electronics, network PCs, minicomputers, mainframe computers, personal digital assistants (PDAs), gaming devices, printers, appliances including set-top, media center, or other appliances, automobile-embedded or attached computing devices, other mobile devices, phone devices including cell phones, wireless phones, and wired phones, distributed computing environments that include any of the above systems or devices, and the like. While various embodiments may be limited to one or more of the above devices, the term computer is intended to cover the devices above unless otherwise indicated.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Implementations of the various techniques described herein may be implemented in digital electronic circuitry, or in computer hardware, firmware, software, or in combinations of them (e.g., an apparatus configured to execute instructions to perform various functionality).

Implementations may be implemented as a computer program embodied in signals (e.g., a pure signal such as a pure propagated signal). Such implementations will be referred to herein as implemented via a "computer-readable transmission medium," which does not qualify herein as a "computer-readable storage medium" or a "computer-readable storage device" as discussed below.

Alternatively, implementations may be implemented via a machine usable or machine readable storage device (e.g., a magnetic or digital medium such as a Universal Serial Bus (USB) storage device, a tape, hard disk drive, compact disk (CD), digital video disk (DVD), etc.), storing executable instructions (e.g., a computer program), for execution by, or to control the operation of, a computing apparatus (e.g., a data processing apparatus), e.g., a programmable processor, a special-purpose processor or device, a computer, or multiple computers. Such implementations may be referred to herein as implemented via a "computer-readable storage medium" or a "computer-readable storage device" and are thus different from implementations that are purely signals such as pure propagated signals (and thus do not qualify herein as a "computer-readable transmission medium" as discussed above). Thus, as used herein, a reference to a "computer-readable storage medium" or a "computer-readable storage device" specifically excludes reference to media and devices that are signals (e.g., propagated signals) per se.

A computer program, such as the computer program(s) described above, can be written in any form of programming language, including compiled, interpreted, or machine languages, and can be deployed in any form, including as a stand-alone program or as a module, component, subroutine, or other unit suitable for use in a computing environment. The computer program may be tangibly embodied as executable code (e.g., executable instructions) on a machine usable or machine readable storage device (e.g., a computer-readable medium). A computer program that might implement the techniques discussed above may be deployed to be executed on one computer or on multiple computers at one site or distributed across multiple sites and interconnected by a communication network.

Method steps may be performed by one or more programmable processors executing a computer program to perform functions by operating on input data and generating output. The one or more programmable processors may execute instructions in parallel, and/or may be arranged in a distributed configuration for distributed processing. Example functionality discussed herein may also be performed by, and an apparatus may be implemented, at least in part, as one or more hardware logic components.

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), liquid crystal display (LCD), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback. For example, output may be provided via any form of sensory output, including (but not limited to) visual output (e.g., visual gestures, video output), audio output (e.g., voice, device sounds), tactile output (e.g., touch, device movement), temperature, odor, etc.

Further, input from the user can be received in any form, including acoustic, speech, or tactile input. For example, input may be received from the user via any form of sensory input, including (but not limited to) visual input (e.g., gestures, video input), audio input (e.g., voice, device sounds), tactile input (e.g., touch, device movement), temperature, odor, etc.

Further, a natural user interface (NUI) may be used to interface with a user. In this context, a "NUI" may refer to any interface technology that enables a user to interact with a device in a "natural" manner, free from artificial constraints imposed by input devices such as mice, keyboards, remote controls, and the like.

Examples of NUI techniques may include those relying on speech recognition, touch and stylus recognition, gesture recognition both on a screen and adjacent to the screen, air gestures, head and eye tracking, voice and speech, vision, touch, gestures, and machine intelligence. Example NUI technologies may include, but are not limited to, touch sensitive displays, voice and speech recognition, intention and goal understanding, motion gesture detection using depth cameras (e.g., stereoscopic camera systems, infrared camera systems, RGB (red, green, blue) camera systems and combinations of these), motion gesture detection using accelerometers/gyroscopes, facial recognition, 3D displays, head, eye, and gaze tracking, immersive augmented reality and virtual reality systems, all of which may provide a more natural interface, and technologies for sensing brain activity using electric field sensing electrodes (e.g., electroencephalography (EEG) and related techniques).

Implementations may be implemented in a computing system that includes a back end component, e.g., as a data server, or that includes a middleware component, e.g., an application server, or that includes a front end component, e.g., a client computer having a graphical user interface or a Web browser through which a user can interact with an implementation, or any combination of such back end, middleware, or front end components. Components may be interconnected by any form or medium of digital data communication, e.g., a communication network. Examples of communication networks include a local area network (LAN) and a wide area network (WAN), e.g., the Internet.

III. Flowchart Description

Features discussed herein are provided as example techniques that may be implemented in many different ways that may be understood by one of skill in the art of computing, without departing from the discussion herein. Such features are to be construed only as example features, and are not intended to be construed as limiting to only those detailed descriptions.

Figure 6A:
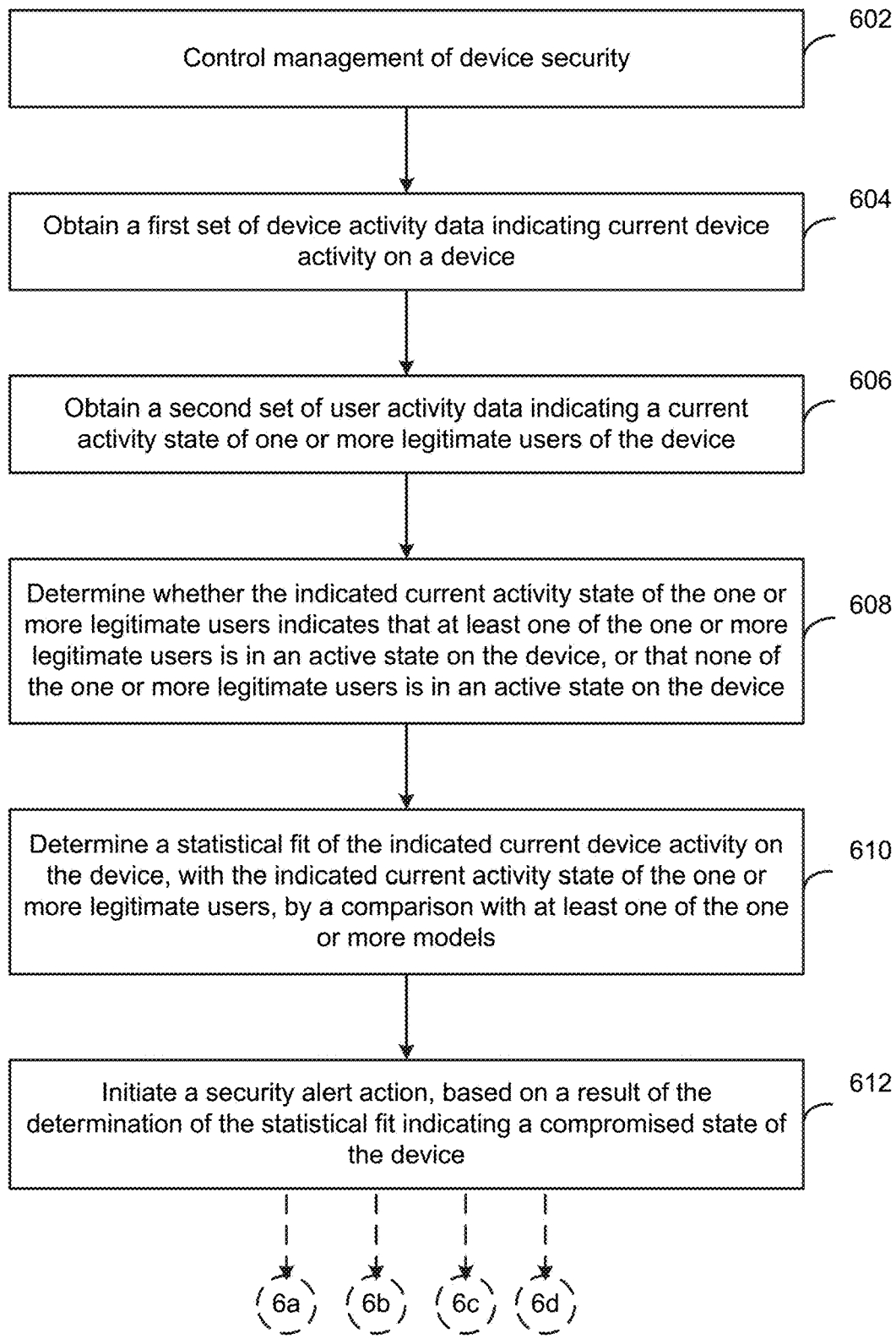
FIGS. 6A-6B are a flowchart illustrating example operations of the system of FIG. 5.
Figure 6B:
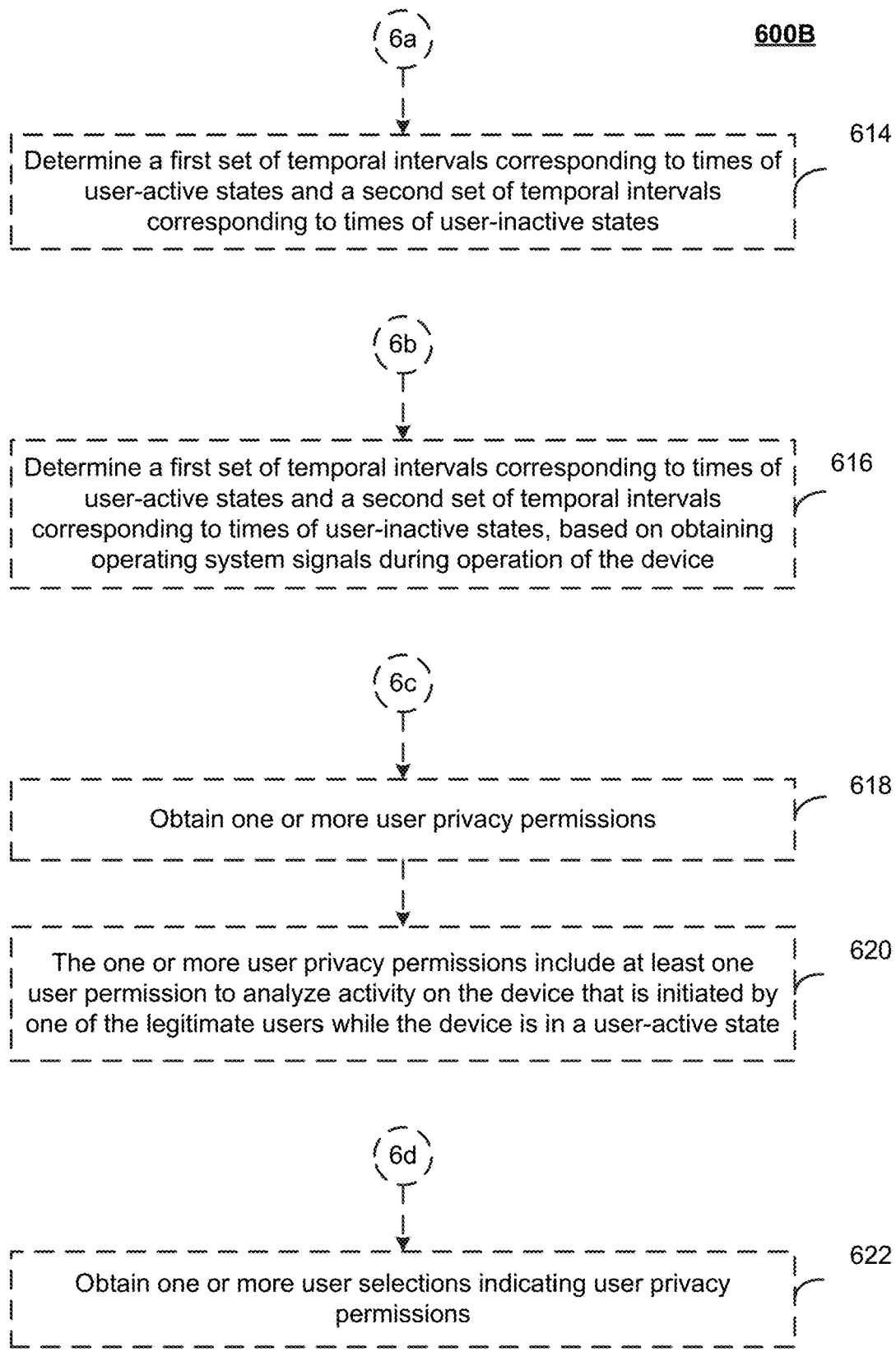

FIGS. 6A-6B are a flowchart illustrating example operations of the system of FIG. 5, according to example embodiments. As shown in the example of FIG. 6A, device security may be controlled (602).

A first set of device activity data indicating current device activity on a device may be obtained (604). A second set of user activity data indicating a current activity state of one or more legitimate users of the device may be obtained (606).

It may be determined whether the indicated current activity state of the one or more legitimate users indicates that at least one of the one or more legitimate users is in an active state on the device, or that none of the one or more legitimate users is in an active state on the device (608).

A statistical fit of the indicated current device activity on the device, with the indicated current activity state of the one or more legitimate users, may be determined, by a comparison with at least one of the one or more models (610). The determination of the statistical fit may include determining a probability of occurrence of at least one device activity event that is indicated in the first set of device activity data, given the indicted current activity state of the one or more legitimate users, and determining whether the determined probability is within a predetermined fitness threshold value.

A security alert action may be initiated, based on a result of the determination of the statistical fit indicating a compromised state of the device (612).

For example, as shown in FIG. 6B, a first set of temporal intervals corresponding to times of user-active states and a second set of temporal intervals corresponding to times of user-inactive states may be determined (614).

For example, controlling management of device security may include determining a first set of temporal intervals corresponding to times of user-active states and a second set of temporal intervals corresponding to times of user-inactive states, based on obtaining operating system signals during operation of the device (616).

For example, controlling management of device security may include obtaining one or more user privacy permissions (618).

For example, the one or more user privacy permissions may include at least one user permission to analyze activity on the device that is initiated by one of the legitimate users while the device is in a user-active state (620).

For example, controlling management of device security may include obtaining one or more user selections indicating user privacy permissions (622).

Figure 7A:
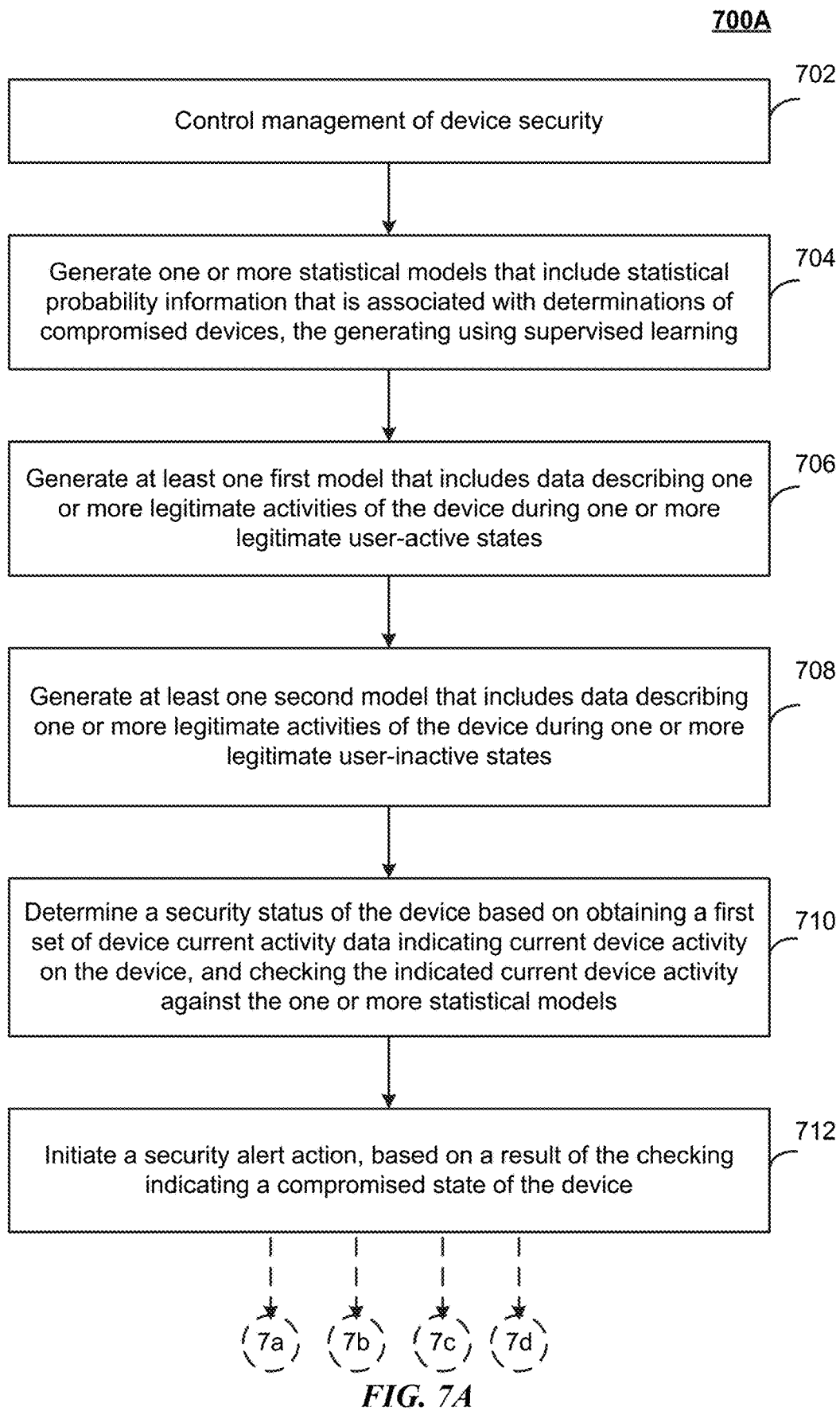
FIGS. 7A-7B are a flowchart illustrating example operations of the system of FIG.
Figure 7B:
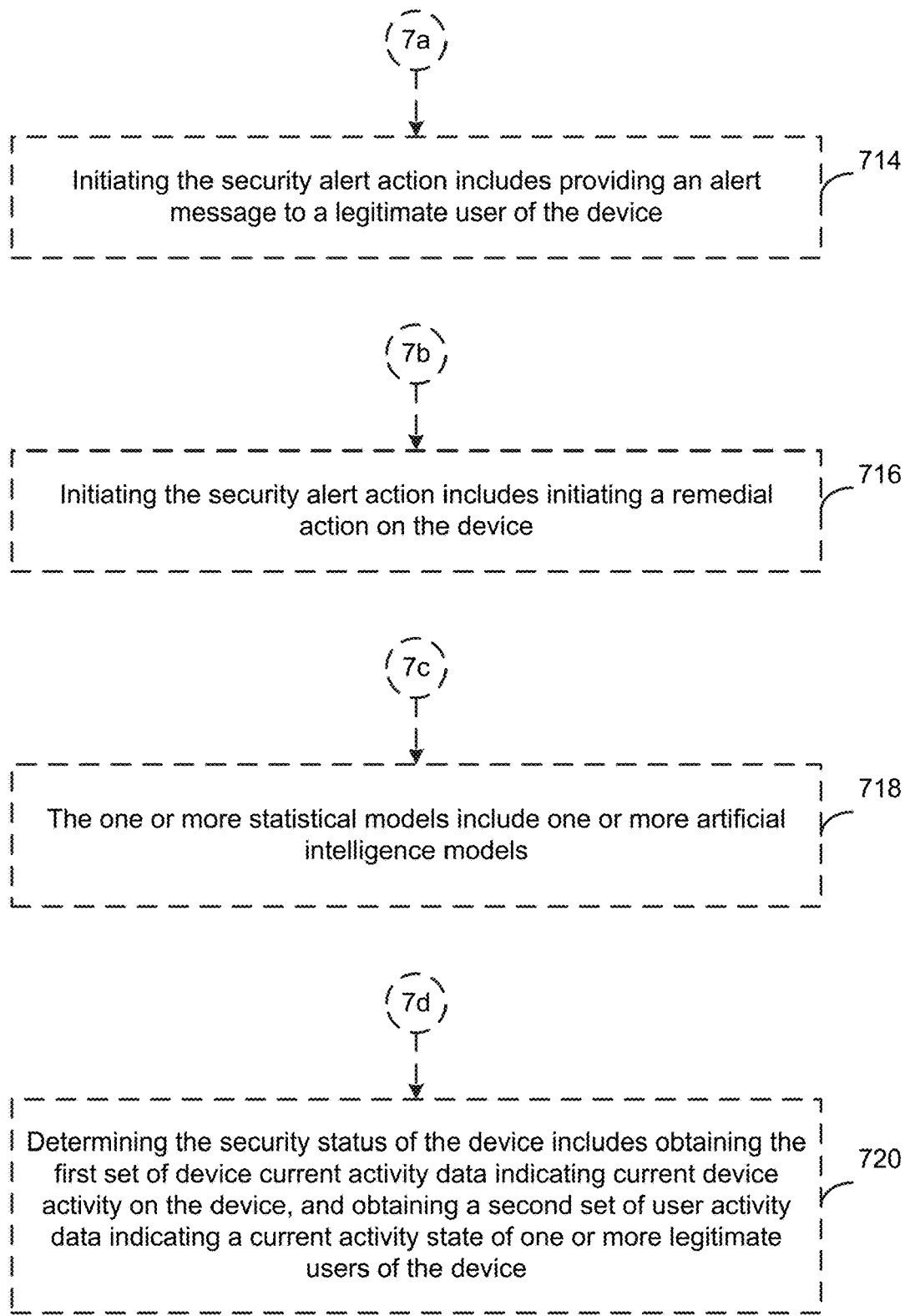

FIGS. 7A-7B are a flowchart illustrating example operations of the system of FIG. 5, according to example embodiments. As shown in the example of FIG. 7A, management of device security may be controlled (702). One or more statistical models that include statistical probability information that is associated with determinations of compromised devices may be generated, the generating using supervised learning (704).

At least one first model that includes data describing one or more legitimate activities of the device during one or more legitimate user-active states may be generated (706). At least one second model that includes data describing one or more legitimate activities of the device during one or more legitimate user-inactive states may be generated (708).

A security status of the device may be determined based on obtaining a first set of device current activity data indicating current device activity on the device, and checking the indicated current device activity against the one or more statistical models (710). A security alert action may be initiated, based on a result of the checking indicating a compromised state of the device (712).

For example, as shown in FIG. 7B, initiating the security alert action may include providing an alert message to a legitimate user of the device (714).

For example, initiating the security alert action may include initiating a remedial action on the device (716).

For example, the one or more statistical models may include one or more artificial intelligence models (718).

For example, determining the security status of the device may include obtaining the first set of device current activity data indicating current device activity on the device, and obtaining a second set of user activity data indicating a current activity state of one or more legitimate users of the device (720).

Figure 8A:
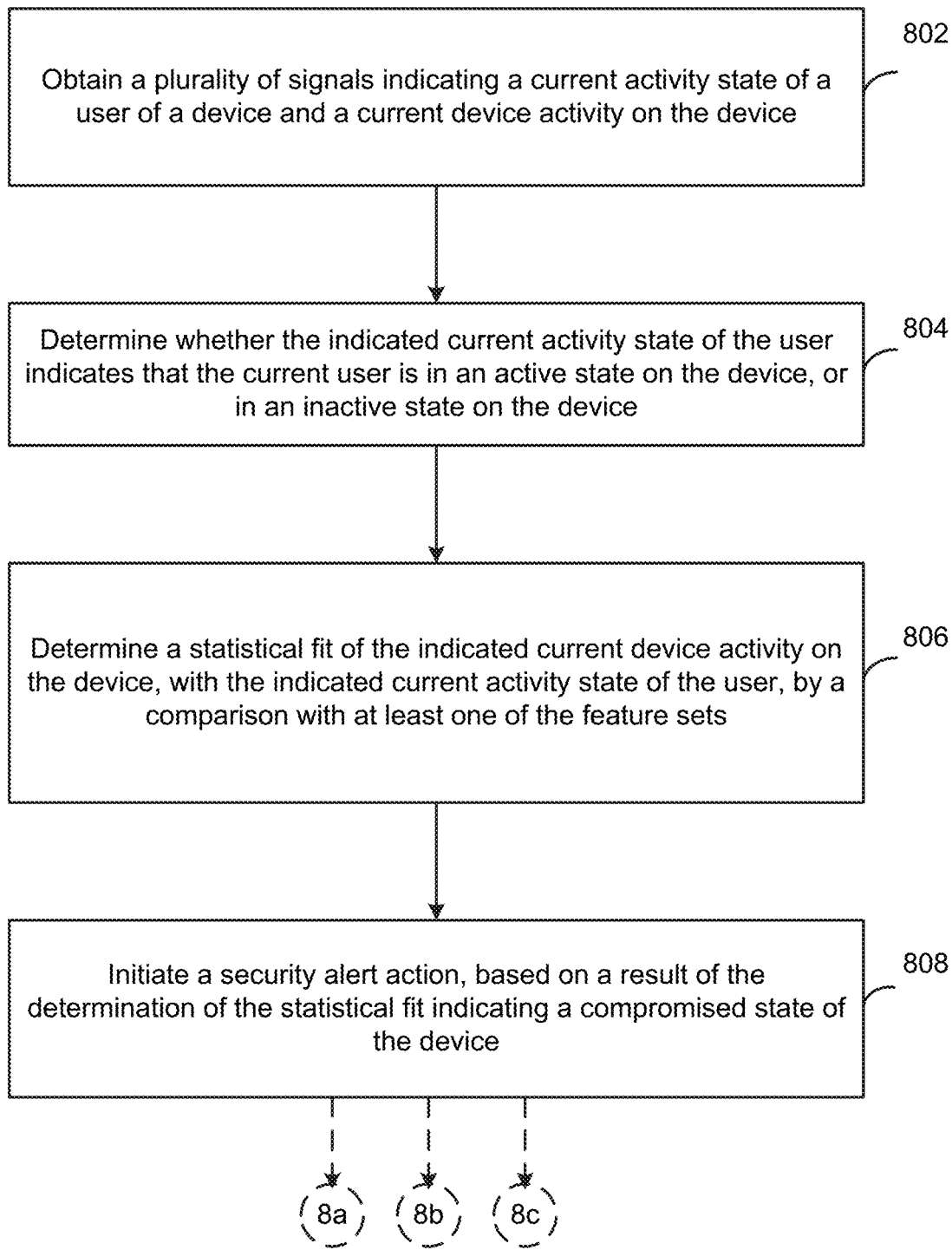
FIGS. 8A-8C are a flowchart illustrating example operations of the system of FIG. 5.
Figure 8B:
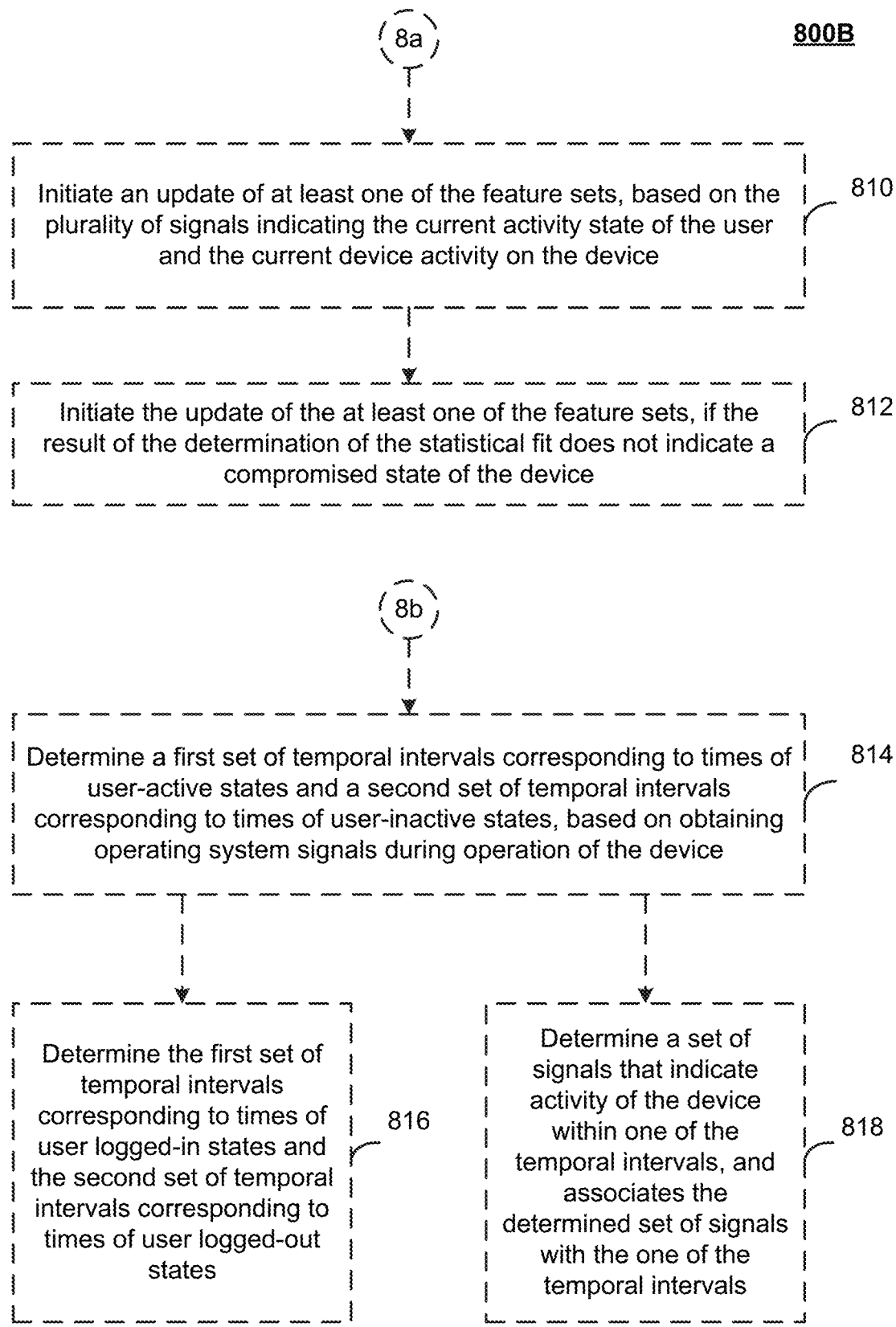
Figure 8C:
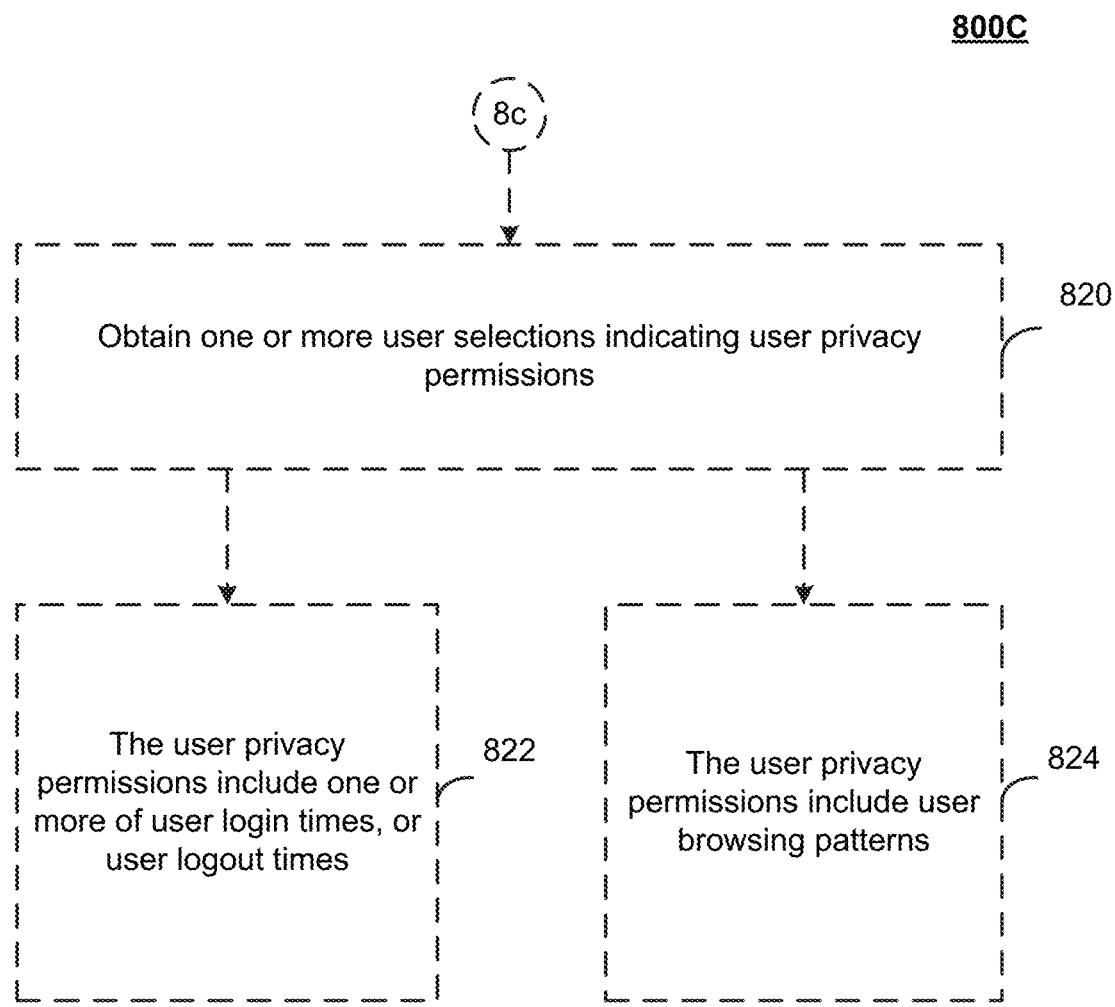

FIGS. 8A-8C are is a flowchart illustrating example operations of the system of FIG. 5, according to example embodiments. As shown in the example of FIG. 8A, a plurality of signals indicating a current activity state of a user of a device and a current device activity on the device may be obtained (802).

It may be determined whether the indicated current activity state of the user indicates that the current user is in an active state on the device, or in an inactive state on the device (804).

A statistical fit of the indicated current device activity on the device, with the indicated current activity state of the user, may be determined by a comparison with at least one of the feature sets (806). Determining the statistical fit may include determining a probability of occurrence of at least one device activity event that is indicated in the obtained plurality of signals, given the indicted current activity state of the user, and determining whether the determined probability is within a predetermined fitness threshold value.

A security alert action may be initiated, based on a result of the determination of the statistical fit indicating a compromised state of the device (808).

For example, as shown in FIG. 8B, an update of at least one of the feature sets may be initiated, based on the plurality of signals indicating the current activity state of the user and the current device activity on the device (810).

For example, the update of the at least one of the feature sets may be initiated, if the result of the determination of the statistical fit does not indicate a compromised state of the device (812).

For example, a first set of temporal intervals corresponding to times of user-active states and a second set of temporal intervals corresponding to times of user-inactive states may be determined, based on obtaining operating system signals during operation of the device (814).

For example, the first set of temporal intervals, corresponding to times of user logged-in states, and the second set of temporal intervals, corresponding to times of user logged-out states, may be determined (816).

For example, a set of signals that indicate activity of the device within one of the temporal intervals may be determined, and the determined set of signals may be associated with the one of the temporal intervals (818).

For example, as shown in FIG. 8C, one or more user selections indicating user privacy permissions may be obtained (820).

For example, the user privacy permissions may include one or more of user login times, or user logout times (822). For example, the user privacy permissions may include user browsing patterns (824).

One skilled in the art of computing will appreciate that many other types of techniques may be used for controlling verification of integrity of operations on data, without departing from the discussion herein.

Features discussed herein are provided as example techniques that may be implemented in many different ways that may be understood by one of skill in the art of computing, without departing from the discussion herein. Such features are to be construed only as example features, and are not intended to be construed as limiting to only those detailed descriptions.

For example, the one or more processors (e.g., hardware processors) may be included in at least one processing apparatus. One skilled in the art of computing will understand that there are many configurations of processors and processing apparatuses that may be configured in accordance with the discussion herein, without departing from such discussion.

In this context, a "component" or "module" may refer to instructions or hardware that may be configured to perform certain operations. Such instructions may be included within component groups of instructions, or may be distributed over more than one group. For example, some instructions associated with operations of a first component may be included in a group of instructions associated with operations of a second component (or more components). For example, a "component" herein may refer to a type of functionality that may be implemented by instructions that may be located in a single entity, or may be spread or distributed over multiple entities, and may overlap with instructions and/or hardware associated with other components.

In this context, a "memory" may include a single memory device or multiple memory devices configured to store data and/or instructions. Further, the memory may span multiple distributed storage devices. Further, the memory may be distributed among a plurality of processors.

One skilled in the art of computing will understand that there may be many ways of accomplishing the features discussed herein.

Customer privacy and confidentiality have been ongoing considerations in computing environments for many years. Thus, example techniques for controlling management of device security may use user input and/or data provided by users who have provided permission via one or more subscription agreements (e.g., "Terms of Service" (TOS) agreements) with associated applications or services associated with such techniques. For example, users may provide consent to have their input/data transmitted and stored on devices, though it may be explicitly indicated (e.g., via a user accepted agreement) that each party may control how transmission and/or storage occurs, and what level or duration of storage may be maintained, if any. Further, identifiers that may be used to identify devices used by a user may be obfuscated, e.g., by hashing actual user information. It is to be understood that any user input/data may be obtained in accordance with the privacy laws and regulations of any relevant jurisdiction.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system for controlling security of a device, the system comprising:

one or more processor(s); and one or more hardware storage device(s) having stored thereon computer-executable instructions that are executable by the one or more processor(s) to cause the system to:

obtain data describing current device activity of a device;

determine a current activity state of the device, wherein the current activity state includes (i) an active state or (ii) an inactive state, such that the device is operable in a plurality of different states;

for each respective state in the plurality of different states, generate a corresponding profile for each respective state based on monitored activities that are monitored while the device operates in each respective state;

determine whether the current device activity statistically fits with the device's current activity state based on the generated profiles by at least performing the following:

for each respective state in the plurality of different states, determining a corresponding probability of occurrence that a particular device activity event, which is described within the data describing the device's current device activity, is likely to occur in each respective state, whereby a plurality of probabilities are determined;

determining that none of the determined probabilities in the plurality of probabilities are within a predetermined fitness threshold value such that the device's current device activity includes suspicious activity; and determining that the current device activity does not statistically fit with the device's current activity state;

based on determining that the current device activity does not statistically fit with the device's current activity state, determine that the device is in a compromised state;

initiate a security alert action based on the determination that the device is in the compromised state, wherein the security alert action includes (i) locking the device and (ii) issuing an alert to a user, and wherein content provided within the alert includes both (i) data describing the suspicious activity and (ii) a reason indicating why the suspicious activity has been characterized as being suspicious; and after the device is locked, update at least one of the profiles associated with the plurality of different states based on data representative of the current device activity.

2. The system of claim 1, further comprising:
an interface that obtains one or more user privacy permissions.

3. The system of claim 2, wherein the one or more user privacy permissions include:
at least one user permission to analyze activity on the device, wherein analyzing the activity is initiated while the device is in the active state.

4. The system of claim 1, further comprising:
an interface that obtains one or more user selections indicating user privacy permissions.

5. A method for controlling security of a device, the method comprising:
obtaining data describing current activity of a device;
determining a current activity state of the device, wherein the current activity state includes (i) an active state or (ii) an inactive state, such that the device is operable in a plurality of different states;
for each respective state in the plurality of different states, generating a corresponding profile for each respective state based on monitored activities that are monitored while the device operates in each respective state;
determining whether the current device activity statistically fits with the device's current activity state based on the generated profiles by at least performing the following:
for each respective state in the plurality of different states, determining a corresponding probability of occurrence that a particular device activity event, which is described within the data describing the device's current device activity, is likely to occur in each respective state, whereby a plurality of probabilities are determined;
determining that none of the determined probabilities in the plurality of probabilities is within a predetermined fitness threshold value such that the device's current device activity includes suspicious activity;
determining that the current device activity does not statistically fit with the device's current activity state;
based on determining that the current device activity does not statistically fit with the device's current activity state, determining that the device is in a compromised state;
initiating a security alert action based on the determination that the device is in the compromised state, wherein the security alert action includes (i) locking the device and (ii) issuing an alert to a user, and wherein content provided within the alert includes both: (i) data describing the suspicious activity and (ii) a reason indicating why the suspicious activity has been characterized as being suspicious; and
after the device is locked, updating at least one of the profiles associated with the plurality of different states based on data representative of the current device activity.

6. The method of claim 5, wherein:
initiating the security alert action includes providing the alert to a legitimate user of the device.

7. The method of claim 5, wherein:
initiating the security alert action includes initiating a remedial action on the device.

8. The method of claim 5, wherein the active state is a state in which a first set of one or more processes of the device are executing during a particular time period.

9. The method of claim 8, wherein the inactive state is a state in which a second set of one or more processes of the device are executing during the particular time period.

10. One or more hardware storage device(s) having stored thereon computer-executable instructions that are executable by one or more processor(s) of a computer system to cause the computer system to:
obtain data describing current activity of a device;
determine a current activity state of the device, wherein the current activity state includes (i) an active state or (ii) an inactive state, such that the device is operable in a plurality of different states;
for each respective state in the plurality of different states, generate a corresponding profile for each respective state based on monitored activities that are monitored while the device operates in each respective state;
determine whether the current device activity statistically fits with the device's current activity state based on the generated profiles by at least performing the following:
for each respective state in the plurality of different states, determine a corresponding probability of occurrence that a particular device activity event, which is described within the data describing the device's current device activity, is likely to occur in each respective state, whereby a plurality of probabilities are determined;
determine that none of the determined probabilities in the plurality of probabilities is within a predetermined fitness threshold value such that the device's current device activity includes suspicious activity;
determine that the current device activity does not statistically fit with the device's current activity state;
based on determining that the current device activity does not statistically fit with the device's current activity state, determine that the device is in a compromised state;
initiate a security alert action based on the determination that the device is in the compromised state, wherein the security alert action includes (i) locking the device and (ii) issuing an alert to a user, and wherein content provided within the alert includes both: (i) data describing the suspicious activity and (ii) a reason indicating why the suspicious activity has been characterized as being suspicious; and
after the device is locked, update at least one of the profiles associated with the plurality of different states based on data representative of the current device activity.

11. The one or more hardware storage device(s) of claim 10, wherein execution of the computer-executable instructions further causes the computer system to:
assign a first weight to newly acquired device activity data, the first weight being greater in value than a second weight assigned to the data representative of the current device activity.

12. The one or more hardware storage device(s) of claim 11, wherein execution of the computer-executable instructions further causes the computer system to:
initiate the update only when the device is identified as not being in the compromised state.

13. The one or more hardware storage device(s) of claim 10, wherein execution of the computer-executable instructions further causes the computer system to:

provide an interface that obtains one or more user selections indicating user privacy permissions.

14. The one or more hardware storage device(s) of claim 13, wherein:
the user privacy permissions include one or more of:
user login times, or
user logout times.

15. The one or more hardware storage device(s) of claim 13, wherein the user privacy permissions include user browsing patterns.

16. A system comprising:
one or more processor(s); and
one or more hardware storage device(s) having stored thereon computer-executable instructions that are executable by the one or more processor(s) to cause the system to:
obtain data describing current activity of a device;
determine a current activity state of the device, wherein the current activity state includes (i) an active state in which a first set of one or more processes of the device are executing during a particular time period or (ii) an inactive state in which a second set of one or more processes of the device are executing during the particular time period, such that the device is operable in a plurality of different states;
for each respective state in the plurality of different states, generate a corresponding profile for each respective state based on monitored activities that are monitored while the device operates in each respective state;
determine whether the current device activity statistically fits with the device's current activity state based on the generated profiles by at least performing the following:
for each respective state in the plurality of different states, determining a corresponding probability of occurrence that a particular device activity event, which is described within the data describing the device's current device activity, is likely to occur in each respective state, whereby a plurality of probabilities are determined;
determining that none of the determined probabilities in the plurality of probabilities is within a predetermined fitness threshold value such that the device's current device activity includes suspicious activity;
determining that the current device activity does not statistically fit with the device's current activity state;
based on determining that the current device activity does not statistically fit with the device's current activity state, determine that the device is in a compromised state;
initiate a security alert action based on the determination that the device is in the compromised state, wherein the security alert action includes (i) locking the device and (ii) issuing an alert to a user, and wherein content provided within the alert includes both: (i) data describing the suspicious activity and (ii) a reason indicating why the suspicious activity has been characterized as being suspicious; and
after the device is locked, update at least one of the profiles associated with the plurality of different states based on data representative of the current device activity.

* * * * *